United States Patent
Nishikawa

(10) Patent No.: US 6,297,875 B1
(45) Date of Patent: Oct. 2, 2001

(54) PHOTOGRAPH PRINTING DEVICE HAVING A LIGHT IRRADIATION CONTROL MECHANISM THAT GENERATES BEAMS OF LIGHT HAVING DIFFERENT OPTIC AXES

(75) Inventor: Hidetoshi Nishikawa, Wakayama (JP)

(73) Assignee: Noritsu Koki Co., Ltd., Wakayama (JP)

(*) Notice: Subject to any disclaimer, the term of this patent is extended or adjusted under 35 U.S.C. 154(b) by 0 days.

(21) Appl. No.: 09/456,703

(22) Filed: Dec. 9, 1999

(30) Foreign Application Priority Data

Dec. 9, 1998 (JP) .................................. 10-350506

(51) Int. Cl.$^7$ .......................... G03B 27/00; G03B 27/72; G03B 27/52
(52) U.S. Cl. ................. 355/41; 355/35; 355/18; 355/40
(58) Field of Search ................. 355/40–41, 35, 355/38, 43, 18; 359/619–621; 358/302; 347/255, 258

(56) References Cited

U.S. PATENT DOCUMENTS

| | | | |
|---|---|---|---|
| 5,870,205 | * | 2/1999 | Declerek et al. ............ 358/302 |
| 5,917,578 | * | 6/1999 | Nakamura ..................... 355/40 |
| 6,061,154 | * | 5/2000 | Campbell et al. ............. 359/32 |
| 6,064,528 | * | 5/2000 | Simpson, Jr. ................. 359/619 |
| 6,118,513 | * | 9/2000 | Delabastita et al. ......... 355/18 |

* cited by examiner

*Primary Examiner*—Russell Adams
*Assistant Examiner*—Hung Henry Nguyen
(74) *Attorney, Agent, or Firm*—Dike, Bronstein, Roberts & Cushman, IP Group Edwards & Angell, LLP; David G. Conlin; George W. Hartnell, III

(57) ABSTRACT

A polarizing plate and a double refracting plate, which are allowed to rotate around an optic axis, are provided to the light-exit side of a liquid crystal layer. The double refracting plate splits incident light into an ordinary ray which travels along a straight optic axis and an extraordinary ray which travels along a refracted optic axis, and supplies the same to a printing paper. The double refracting plate is laminated to the polarizing plate in such a manner that the splitting direction of the former matches with the polarizing plate of the latter, thereby allowing only the extraordinary ray to exit from the double refracting plate. By rotating the two plates together as one body by, for example, 90 degrees around the optic axis and exposing the printing paper each time, resolution attained without displacing the liquid crystal layer or printing paper with respect to the other is nearly as high as the one obtained by displacing the liquid crystal layer or printing paper. Because the liquid crystal layer and printing paper do not have to be displaced, no adverse effect, such as vibration, is given to the liquid crystal layer, and the pixel displacement can be readily effected with not only a sheet paper, but also a roll of paper.

48 Claims, 17 Drawing Sheets

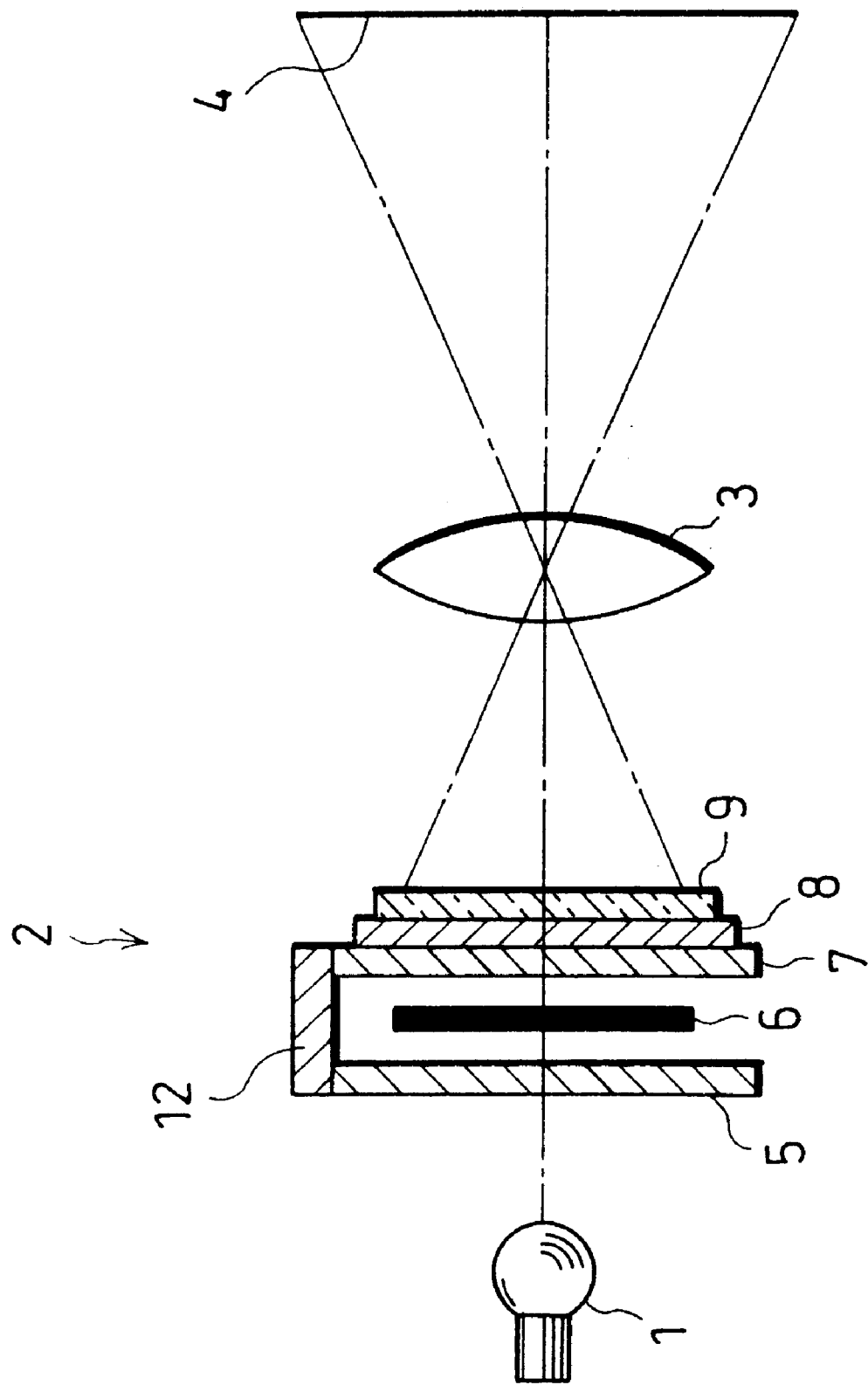

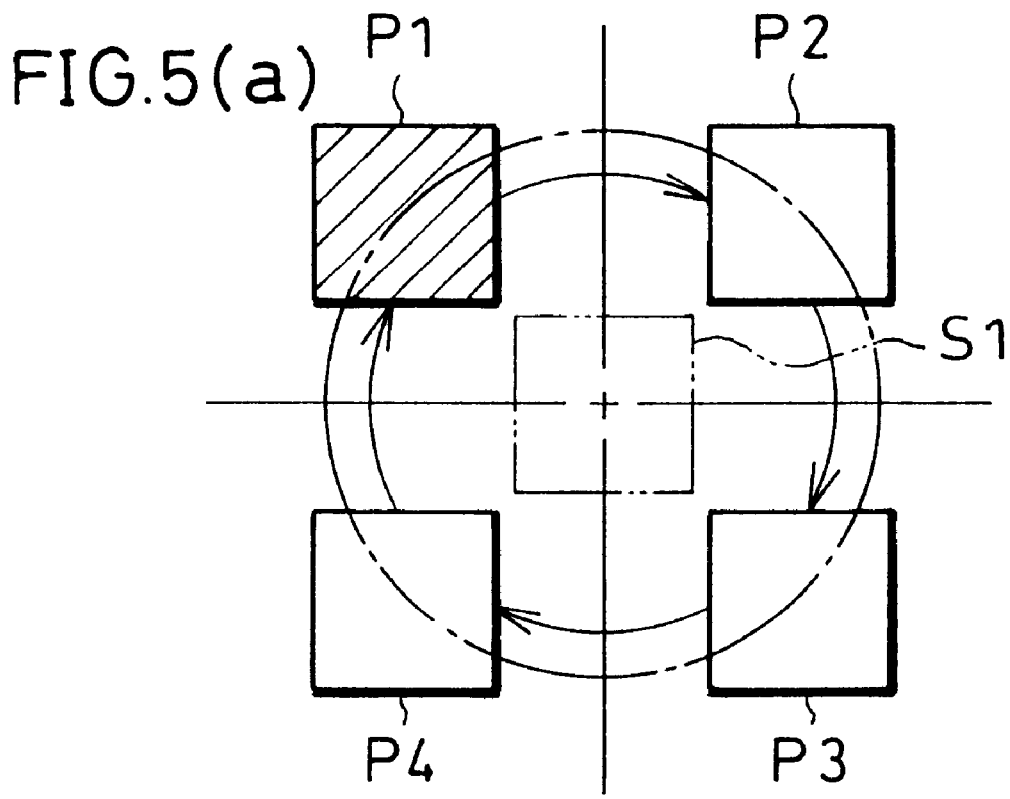
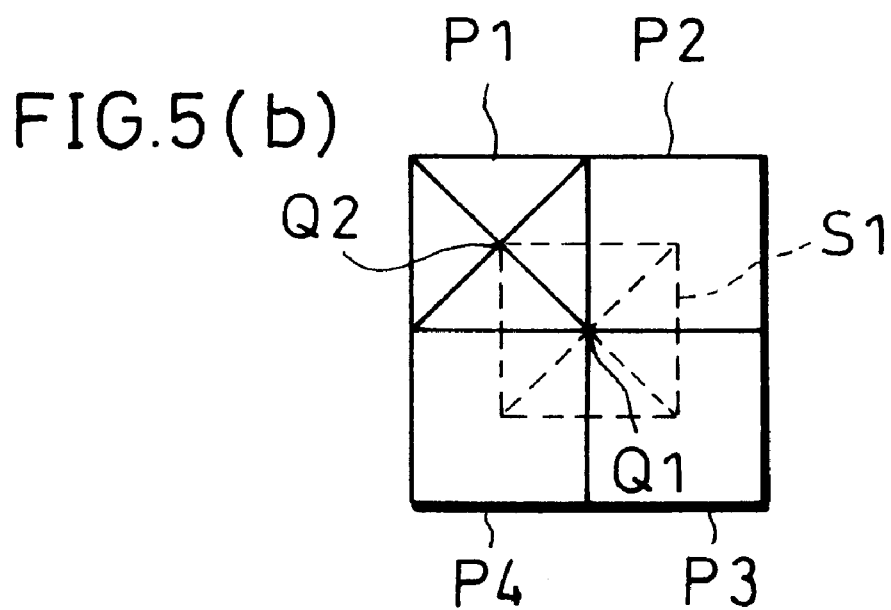

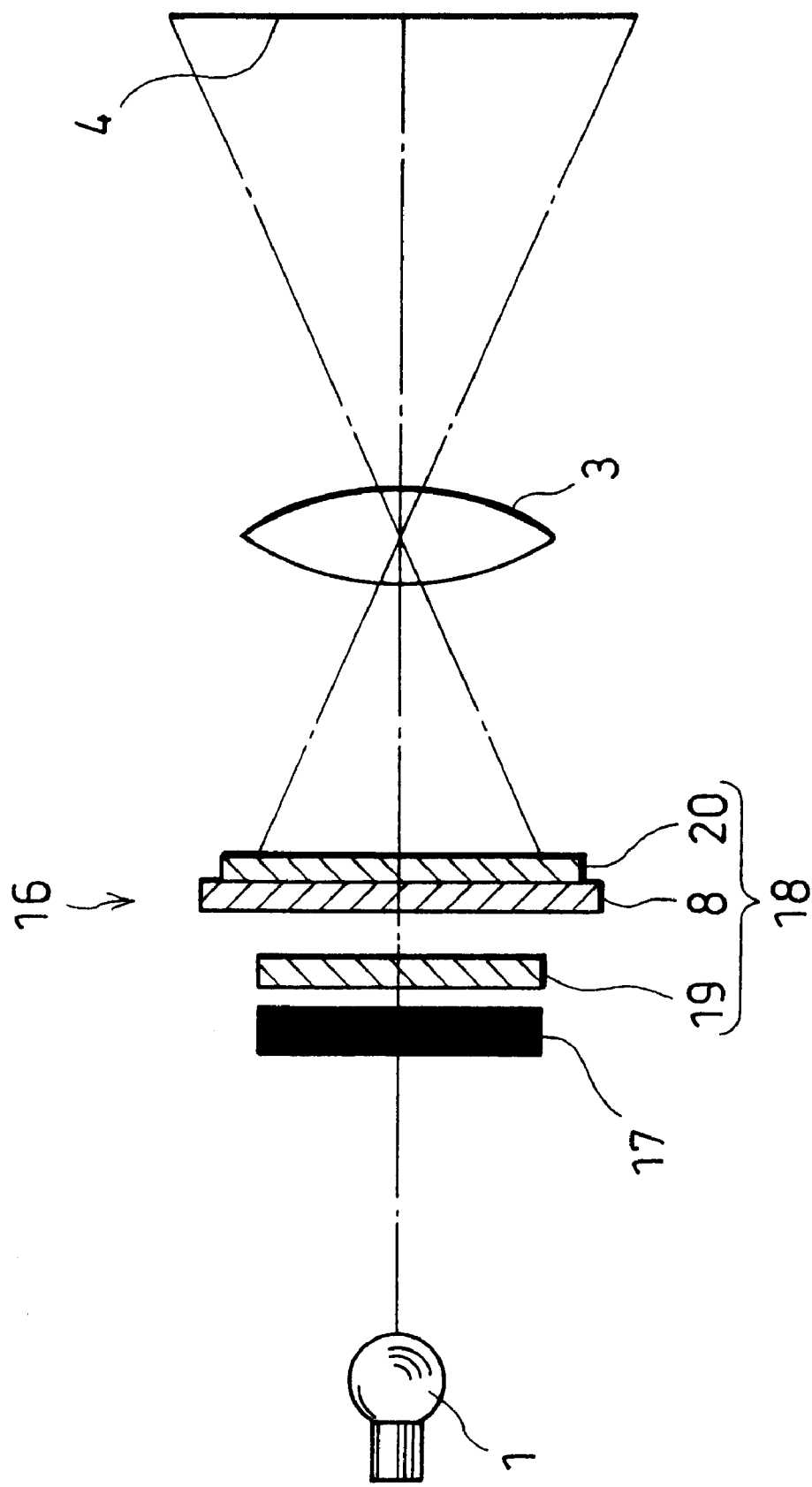

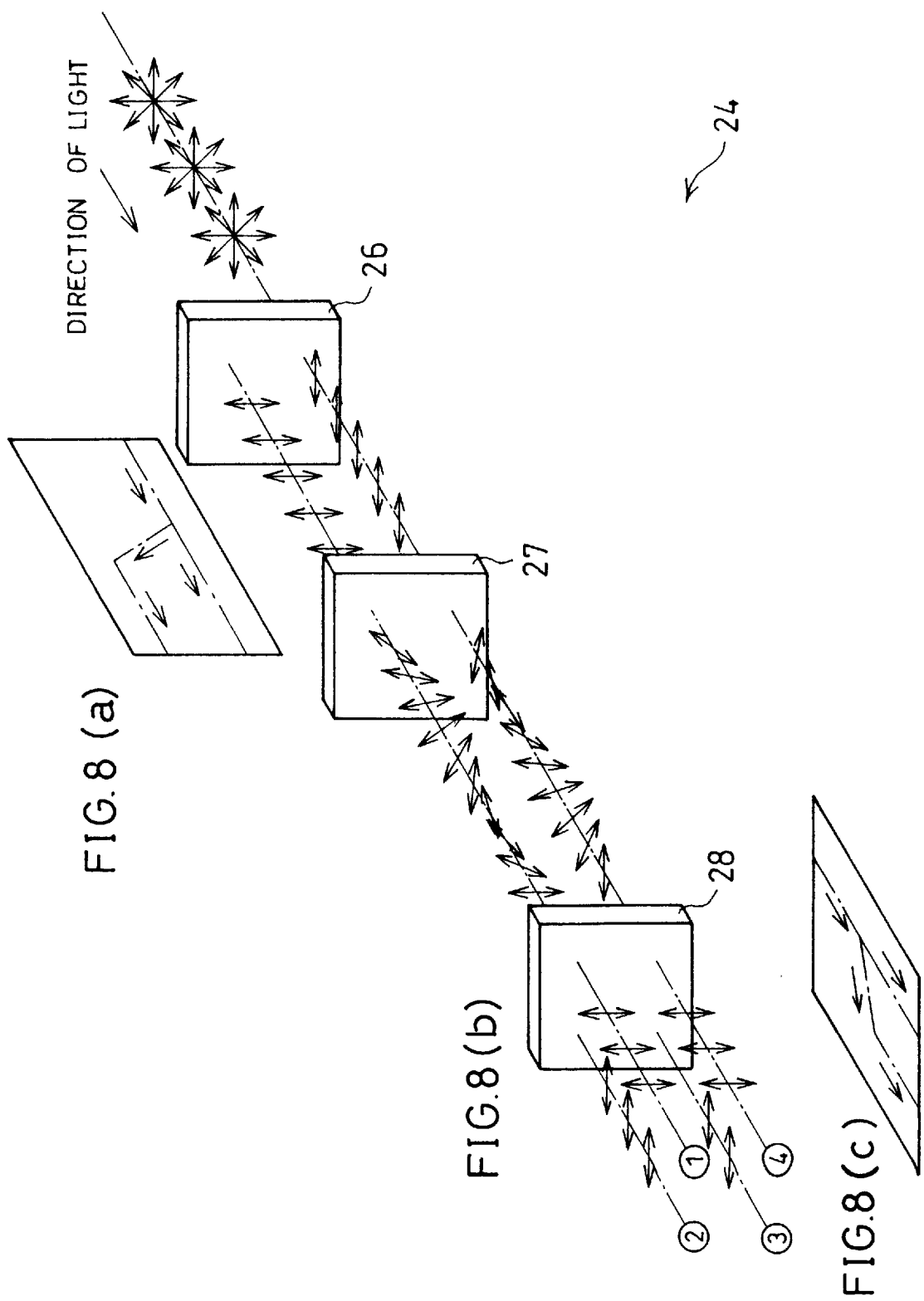

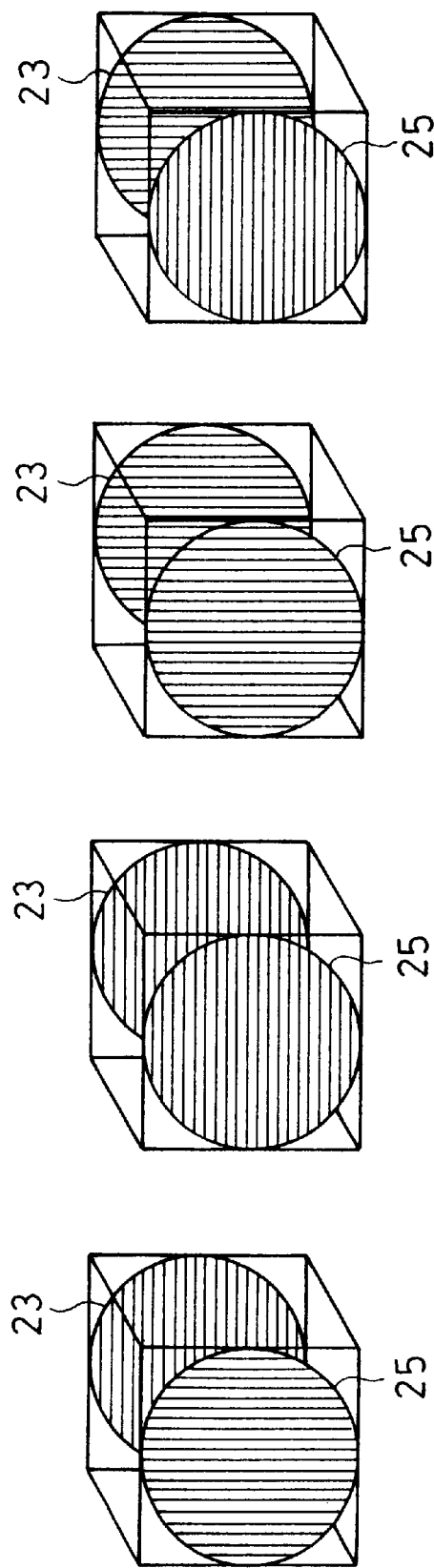

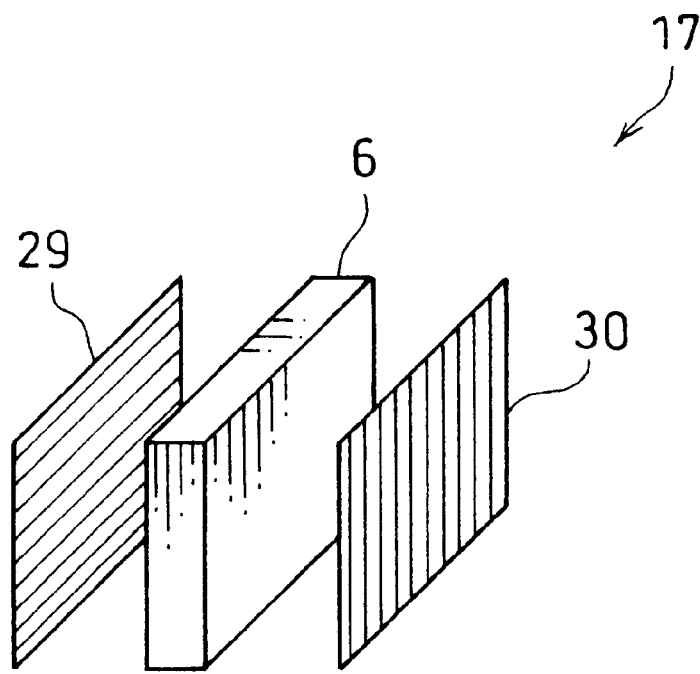
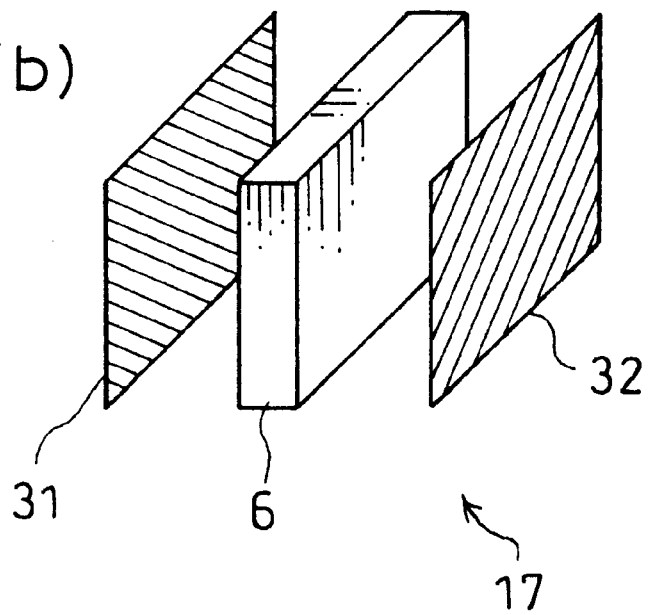

PHOTOGRAPH PRINTING DEVICE HAVING A LIGHT IRRADIATION CONTROL MECHANISM THAT GENERATES BEAMS OF LIGHT HAVING DIFFERENT OPTIC AXES

FIELD OF THE INVENTION

The present invention relates to a photograph printing device which, by irradiating light emitted from a light source to a printing paper used as a photosensitive material through an image display device, such as a liquid crystal display, prints out an image displayed on the image display device onto the printing paper, and more particularly, to a photograph printing device which can print out a high-quality image by pixel displacement.

BACKGROUND OF THE INVENTION

Researches and development have been conducted actively with a photograph printing device which serves as a so-called digital exposure device employing an image display device, such as a liquid crystal display. The photograph printing device of this type controls passing of light emitted from a light source through each pixel in the liquid crystal display by driving each pixel in accordance with image information, and irradiates the light having passed through each pixel on a printing paper, thereby printing out an image corresponding to the image information onto the printing paper.

Incidentally, resolution of a printed out image by such a digital exposure device corresponds to the number of pixels in the liquid crystal device. In order to improve resolution, for example, only the number of pixels in the liquid crystal display has to be increased. In this case, however, the liquid crystal display as a whole is undesirably upsized because of the increased number of pixels.

In recent years, a technique so-called "pixel displacement" is generally used in improving resolution of the printed out image. The pixel displacement is a technique, in which either the liquid crystal display or the printing paper is displaced relatively with respect to the other by, for example, half the pixel, and exposure is effected in each displacement. Consequently, although the number of the pixels in the liquid crystal display remains the same, resolution can be improved as if the number of pixels in the liquid crystal display were increased. Therefore, in this case, image quality can be upgraded by a less expensive device of a smaller size. The following will describe a photograph printing device which can effect the pixel displacement.

As shown in FIG. 16(a), the photograph printing device includes a lamp 51 serving as a light source, an image display device 52 composed of, for example, a liquid crystal display, a lens 53, rotatable BGR filters 54, and an XY stage 56, which are sequentially positioned in this order along the direction of light emitted from the lamp 51 on an optic axis linking the lamp 51 and XY stage 56. The XY stage 56 is furnished with a table, which has a main surface perpendicular with respect to the optic axis and is allowed to move in two directions perpendicular to each other within a single plane. According to the above arrangement, when a printing paper 55 is placed on the XY stage 56, the printing paper 55 can be moved in either of the two directions perpendicular to each other in the same plane.

With the above arrangement, passing of light through each pixel in the image display device 52 is controlled by driving each pixel with an image signal. Thus, light emitted from the lamp 51 is modulated at each pixel in the image display device 52 to reach the lens 53 and then focused. Light having passed through the lens 53 is irradiated to the printing paper 55 through one of the BGR filters 54, for example, the B (Blue) filter. When printing of a blue image is completed, the BGR filters 54 are rotated, and by sequentially setting the G (Green) filter and R (Red) filter at the position matching on the optic axis, a green image and a red image are printed out sequentially in the same manner as above, whereby a color image is printed out onto the printing paper 55. FIG. 17(a) shows pixels which form the color image printed out onto the printing paper 55 by the first exposure (exposure of each of BGR).

When the first print out of the color image is completed, the XY stage 56 is driven so as to displace the printing paper 55 in a horizontal direction by one pixel, for example. Then, the second print out of a color image is effected in the same manner as above. FIG. 17(b) shows pixels which form the color image printed onto the printing paper 55 up to the second exposure.

Thereafter, the XY stage 56 is driven so as to displace the printing paper 55 in a vertical direction by one pixel, and the third print out of a color image is effected in the same manner as above. Finally, the printing paper 55 is displaced back in the horizontal direction by one pixel, and the fourth print out of a color image is effected in the same manner as above. FIGS. 17(c) and 17(d) show pixels which form the color images printed onto the printing paper 55 up to the third exposure and fourth exposure, respectively.

Each pixel in the image display device 52 is supplied with a different image signal as a driving signal in every exposure (print out) from first to fourth.

By effecting the pixel displacement in the above manner, resolution of the image printed out onto the printing paper 55 can be improved two times both in the horizontal and vertical directions, thereby making it possible to upgrade the quality of the image printed out onto the printing paper 55.

The foregoing explained the arrangement, in which the image display device 52 was fixed and the printing paper 55 was displaced by one pixel with respect to the image display device 52 in each exposure. However, as shown in FIG. 16(b), the printing paper 55 may be fixed, and the image display device 52 may be placed on the XY stage 56 so as to be allowed to move in two directions perpendicular to each other in a single plane perpendicular with respect to the optic axis, so as to displace the image display device 52 by one pixel with respect to the printing paper 55. In this case, pixels as shown in FIGS. 17(a) through 17(d) can be obtained by the pixel displacement as well.

Incidentally, as shown in FIG. 16(a), with the photograph printing device of the above arrangement, that is, of the type that displaces the printing paper 55, there will be no problem when the printing paper 55 is a standard size paper (so-called sheet paper), such as a B5 or A4 (specified below) paper, and a postcard. However, in case that a paper roll made of a lengthy piece of paper with a particular width, namely, a roll of paper, is used as the printing paper 55, it is very difficult to displace the printing paper 55 because of its length. For example, even if transportation mechanism and holding mechanism for a roll of paper are improved so as to realize the displacement thereof, the arrangements of the transportation mechanism and holding mechanism becomes so complicated that it is well predicted that the costs of the device itself will be increased.

If it is arranged in such a manner that the printing paper 55 is displaced only in the exposure section, the printing paper 55 is folded or wrinkled, thereby deteriorating the quality of the printing paper 55. Moreover, if an image is printed out onto such a deteriorated printing paper 55, the display quality and reliability of the image are reduced. For the reasons discussed above, it is preferable not to adopt this arrangement as much as possible.

Incidentally, the B5 and A4 are the size of papers defined by JIS (Japanese Industrial Standards). More specifically, B5 is a paper size of 182 mm×257 mm, and A4 is a paper size of 210 mm×297 mm.

On the other hand, according to the arrangement of the photograph printing device of the type which displaces the image display device 52 as shown in FIG. 16(b), vibration of the XY stage 56 is conveyed to the image display device 52 each time the image display device 52 is displaced. As previously mentioned, the image display device 52 is composed of, for example, the liquid crystal display. However, the liquid crystal display includes many scanning lines and signal lines for driving the individual pixels, and these lines are so thin and fragile to vibration, impact, etc. For this reason, with the above arrangement, vibrations of the XY stage 56 give adverse effects, such as breaking of the lines, to the image display device 52, and therefore, the display quality of the image display device 52 is degraded, and so is the quality of the printed out image.

SUMMARY OF THE INVENTION

It is therefore an object of the present invention to provide a photograph printing device, which can readily effect the pixel displacement with not only a sheet paper, but also a roll of paper without giving adverse effects, such as vibrations, to the image display device, thereby making it possible to obtain a high-resolution image.

In order to fulfill the above and other objects, a photograph printing device of the present invention is characterized by being furnished with:

a light modulation element, provided with a plurality of pixels, for controlling supply of light to a photosensitive material through each pixel in accordance with image data;

a light source for irradiating light to the light modulation element; and light irradiation control means for generating more than one beam of light, each having a different optic axis, from incident light through a particular pixel in the light modulation element, and for irradiating each of generated beams of light to the photosensitive material.

According to the above arrangement, the light irradiation control means irradiates the incident light thereon from the light source through the particular pixel in the light modulation element to the photosensitive material. By controlling supply of light to the photosensitive material through each pixel using the light modulation element in accordance with image data, an image corresponding to the image data is printed out onto the photosensitive material.

Because the light irradiation control means generates more than one beam of light, each having a different optic axis, from the incident light through the particular pixel in the light modulation element, and irradiates each of the generated beams of light to the photosensitive material, more than one beam of light is irradiated through the particular pixel at different irradiation positions on the photosensitive material. Thus, the number of pixels on the photosensitive material corresponding to the particular pixel increases with the number of irradiated beams of light without displacing the light modulation element or photosensitive material relatively with respect to the other. In other words, even if exposure is effected while the light modulation element and photosensitive material are fixed to their original positions, resolution attained in this case is nearly as high as the one obtained by displacing the light modulation element or photosensitive material relatively with respect to the other.

Thus, according to the above arrangement, the pixel displacement is effected to improve resolution of a printed out image, but a driving device or mechanism to displace the light modulation element or photosensitive material can be omitted. Consequently, an adverse effect, such as vibration, to the light modulation element can be prevented in a reliable manner, while the pixel displacement is readily effected with a photosensitive material including not only a sheet paper, but also a roll of paper.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a cross section schematically showing an arrangement of a photograph printing device in accordance with one embodiment of the present invention;

FIG. 5(a) is a view explaining positions (pixels) on the printing paper, to which light through a particular pixel in the liquid crystal layer is irradiated by pixel displacement effected by the photograph printing device;

FIG. 5(b) is a view explaining a state where the positions (pixels) are arranged in the most proximate manner by adjusting a thickness of the double refracting plate;

FIG. 6 is a cross section schematically showing an arrangement of a photograph printing device in accordance with another embodiment of the present invention;

FIG. 8(a) is a view explaining incident light projected onto a perpendicular plane, being split by one of two double refracting plates forming a double refracting filter of the photograph printing device;

FIG. 8(b) is a view explaining a schematic arrangement of the double refracting filter and how incident light is split into beams of light each having a different optic axis by the double refracting filter;

FIG. 8(c) is a view explaining incident light projected onto a horizontal plane, being split by the other double refracting plate forming the double refracting filter;

FIGS. 9(a) through 9(d) are views explaining different polarizing directions of polarizing plates provided to the double refracting filter at the light-incident side and light-exit side, respectively;

FIG. 10(a) is a perspective view showing an arrangement of an LCD which includes two polarizing plates having the horizontal and vertical polarizing directions, respectively;

FIG. 10(b) is a perspective view showing an arrangement of an LCD which includes two polarizing plates with their respective polarizing directions being rotated around the optic axis from those shown in FIG. 10(a);

DESCRIPTION OF THE EMBODIMENTS (Embodiment 1)

Figure 2B:
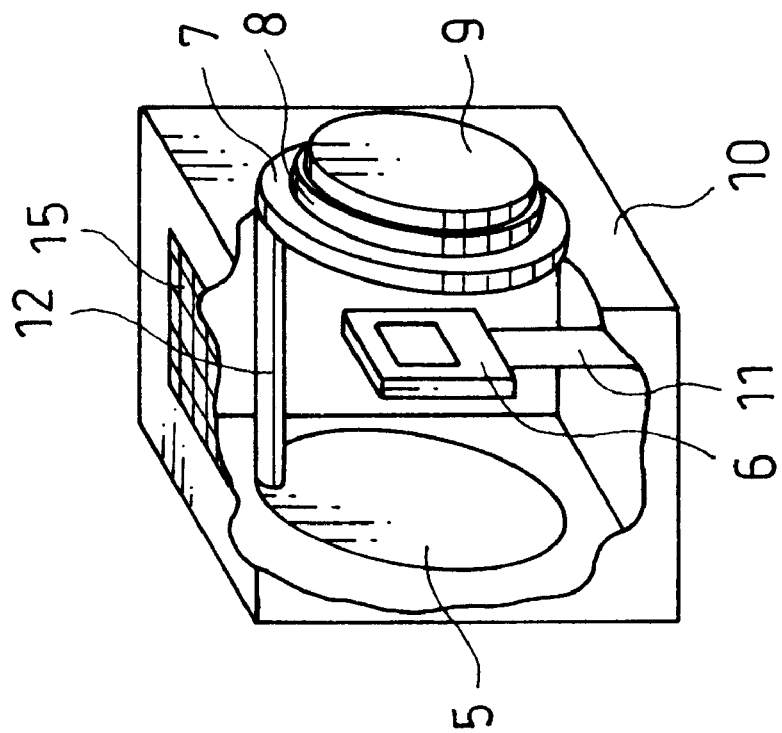
FIG. 2(b) is a perspective broken view of FIG. 2(a)

Referring to FIGS. 1 through 5(b), the following description will describe one embodiment of the present invention.

A photograph printing device in accordance with the present embodiment includes, as shown in FIG. 1, a lamp 1 serving as a light source, a light control section 2, and a printing lens 3. This photograph printing device forms a digital exposure device, which irradiates light emitted from the lamp 1 to a printing paper 4 (photosensitive material) through the light control section 2 and printing lens 3 so as to print out onto the printing paper 4 an image corresponding to light having passed through the light control section 2 at a predetermined magnification.

The light control section 2 includes a polarizing plate 5, a liquid crystal layer 6, another polarizing plate 7, a 2-point-splitting double refracting filter (hereinafter, referred to simply as double refracting plate) 8, and a glass plate 9, which are sequentially positioned in this order along the direction of light on the optic axis linking the lamp 1 and printing paper 4.

The liquid crystal layer 6 (light modulation element) is a liquid crystal display element (image display device) which comprises a transparent substrate, a transparent counter substrate, and liquid crystal sandwiched by these substrates. For example, a matrix of TFTs (Thin Film Transistors), each serving as an active element, are provided to the transparent substrate over the surface opposing the liquid crystal with a one-to-one correspondence with the pixels. A counter electrode and color filters (RGB) are formed on the counter substrate over the surface opposing the liquid crystal.

As shown in FIG. 2(b), the liquid crystal layer 6 is supported by a supporting member 11 in a box 10. The box 10 is sealed airtight, so that dirt, dust, etc. will not adhere to the surface of the liquid crystal layer 6. According to this arrangement, deterioration of the quality of a printed out image caused by adhesion of dust, etc. onto the surface of the liquid crystal layer 6 can be avoided in a reliable manner.

In addition, orientation films are formed on the transparent substrate and counter substrate over their respective surfaces opposing the liquid crystal in such a manner that their directions of orientation cross at right angles with each other. Consequently, the liquid crystal sandwiched by the transparent substrate and counter substrate is twisted by 90 degrees. By controlling a voltage applied to the liquid crystal for each pixel in accordance with image data, and thereby controlling light emitted from the lamp 1 and passing through the liquid crystal through each pixel, a color image corresponding to the image data is displayed on the liquid crystal layer 6, which is printed out onto the printing paper 4 through the printing lens 3.

The liquid crystal layer 6 may be a TN (Twisted Nematic) liquid crystal display element, an STN (Super Twisted Nematic) liquid crystal element, etc. Also, MIMs (Metal Insulator Metals) may be used as the active elements instead of TFTs.

Even if the liquid crystal layer 6 is not furnished with color filters and thereby displays a monochromatic image, a color image can be printed out onto the printing paper 4 in the same manner as above by, for example, providing a BGR wheel to the liquid crystal layer 6 at the light-incident side, so as to supply each color of BGR sequentially to the liquid crystal layer 6.

For ease of explanation, the liquid crystal layer 6 furnished with the polarizing plates respectively at the light-incident and light-exit sides is referred to as the LCD (Liquid crystal display). Thus, the liquid crystal layer 6 means a liquid crystal display element itself having no polarizing plates. In the following, the liquid crystal layer 6 and LCD are distinguished from each other.

Of all the beams of randomly polarized light emitted from the lamp 1, the polarizing plate 5 transmits only the light (linearly polarized light) having a predetermined polarizing direction, and allows the same to reach the liquid crystal layer 6. Of all the beams of light exiting from the liquid crystal layer 6, the polarizing plate 7 transmits only the light having a predetermined polarizing direction, and allows the same to reach the double refracting plate 8. Here, the light having the predetermined polarizing direction is defined as light which, when spilt into two components: a component in the predetermined direction and a component in a direction perpendicular to the predetermined direction, includes the component in the predetermined direction, for example. The polarizing plates 5 and 7 are positioned in such a manner that their respective polarizing directions cross at right angles with each other in the normally white mode, and become parallel to each other in the normally black mode.

The polarizing plates 5 and 7 are linked to each other by a linking member 12 at their circumferences. By rotating the linking member 12 around the optic axis by means of an unillustrated driving device, the polarizing plates 5 and 7 rotate around the optic axis together as one unit, in association of which the double refracting plate 8 fixed to the polarizing plate 7 and the glass plate 9 fixed to the double refracting plate 8 also rotate around the optic axis. Therefore, the polarizing plates 5 and 7 and the linking member 12 form rotating means for rotating the double refracting plate 8.

In the present embodiment, because the liquid crystal layer 6 is supported by the supporting member 11 as has been described above, the linking member 12 inevitably touches the supporting member 11 while it rotates once around the optic axis. This makes it impossible to rotate the linking member 12 more than once in the same direction. Thus, in the present embodiment, the position at which the linking member 12 touches the supporting member 11 is set as the starting point of rotation, and the linking member 12 starts to rotate in a direction to move away from the starting point and stops rotating at a position where it touches the supporting member 11 again (stopping point). In short, the linking member 12 is arranged to rotate back and forth between the starting point and stopping point.

It should be appreciated, however, that the linking member 12 does not have to rotate in the above manner. For example, the linking member 12 may be fixed to a certain position in a rotatable manner, and the linking member 12 may be linked to the polarizing plates 5 and 7 separately by means of gears or the like, so as to allow the polarizing plates 5 and 7 to rotate in association with rotation of the linking member 12. In this case, the polarizing plates 5 and 7 can rotate more than once in the same direction, because the linking member 12 does not touch the supporting member 11.

Figure 3:
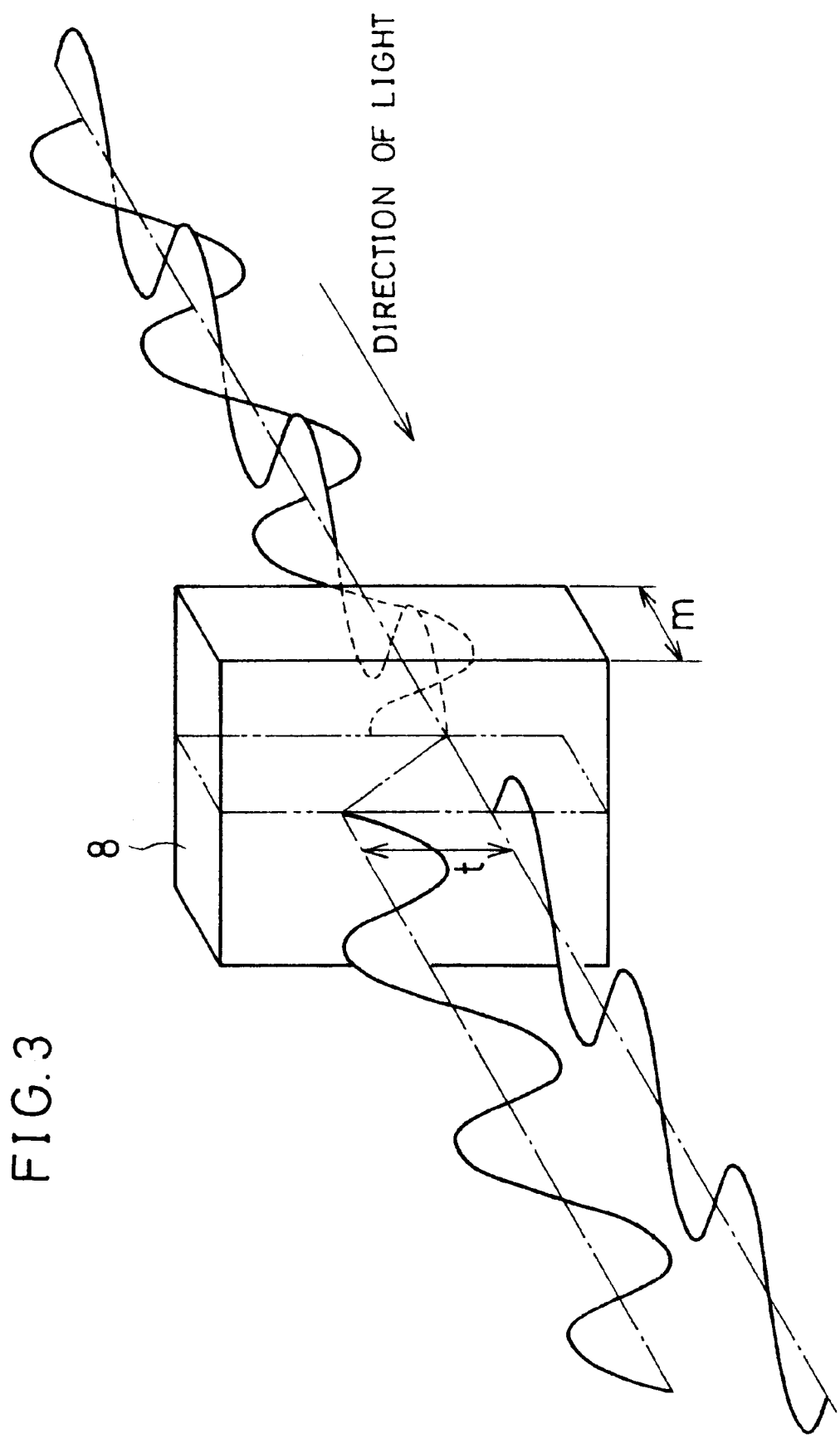
FIG. 3 is a view explaining how incident light is split into an ordinary ray and an extraordinary ray by a double refracting plate provided to the light control section.

The double refracting plate 8 (refracting member, splitting element) is made of crystals of a hexagonal system, such as calcite and quartz crystal, and as shown in FIG. 3, it splits incident light into an ordinary ray which travels along a straight optic axis, and an extraordinary ray which travels along a refracted optic axis. The extraordinary ray is shifted by (t) from the ordinary ray in the splitting direction (shifting direction) and exits from the double refracting plate 8. A quantity (t) of shifting of the extraordinary ray with respect to the ordinary ray corresponds to a thickness (m) of the double refracting plate 8, that is, the greater the thickness (m), the greater the quantity (t) of shifting.

The extraordinary ray is a beam of linearly polarized light that oscillates in the shifting direction and does not obey the ordinary laws of refraction. On the other hand, the ordinary ray is a beam of linearly polarized light that oscillates in the direction perpendicular to the shifting direction, and exits from the double refracting plate 8 in accordance with the ordinary laws of refraction.

The double refracting plate 8 is fixed to the surface of the rotatable polarizing plate 7 in such a manner that the polarizing direction of the polarizing plate 7 (see FIG. 1) and the shifting direction of the extraordinary ray become parallel to each other. Consequently, of all the beams of light exiting from the liquid crystal layer 6, the light which oscillates in the direction perpendicular to the shifting direction is blocked (cut) by the polarizing plate 7 and does not reach the double refracting plate 8. On the other hand, of all the beams of light exiting from the liquid crystal layer 6, the light which oscillates in the shifting direction passes through the polarizing plate 7 and reaches the double refracting plate 8. Thus, because the incident light on the double refracting plate 8 excludes the component in the direction perpendicular to the splitting direction of the double refracting plate 8 (that is, the oscillating direction of the ordinary ray), only the extraordinary ray exits from the double refracting plate 8. In view of the foregoing, it can be understood that the double refracting plate 8 of the present embodiment is furnished with a function as a refracting member which merely refracts incident light and allows the same to exit, and that the shifting direction corresponds to the refracting direction.

By positioning the double refracting plate 8 in the above manner with respect to the polarizing plate 7, only the extraordinary ray which will be used for the pixel displacement can be taken out. Consequently, for example, by rotating the polarizing plate 7 and double refracting plate 8 together as one unit, an irradiation position on the printing paper 4 of the extraordinary ray taken out in the above manner can be changed. Thus, the polarizing plate 7 and double refracting plate 8 form light irradiation control means for generating light from incident light through a particular pixel in the liquid crystal layer 6 to have a different optic axis from that of the incident light, and irradiating the generated light to the printing paper 4 while changing the irradiation position thereof.

The glass plate 9 provided to the double refracting plate 8 on the light-exit side is allowed to rotate together with the polarizing plate 7 and double refracting plate 8, and prevents deterioration of quality of an image printed out onto the printing paper 4 caused by dirt and dust in the air as much as possible. The following will explain this mechanism with reference to schematic views of FIGS. 4(*a*) and 4(*b*).

Figure 4A:
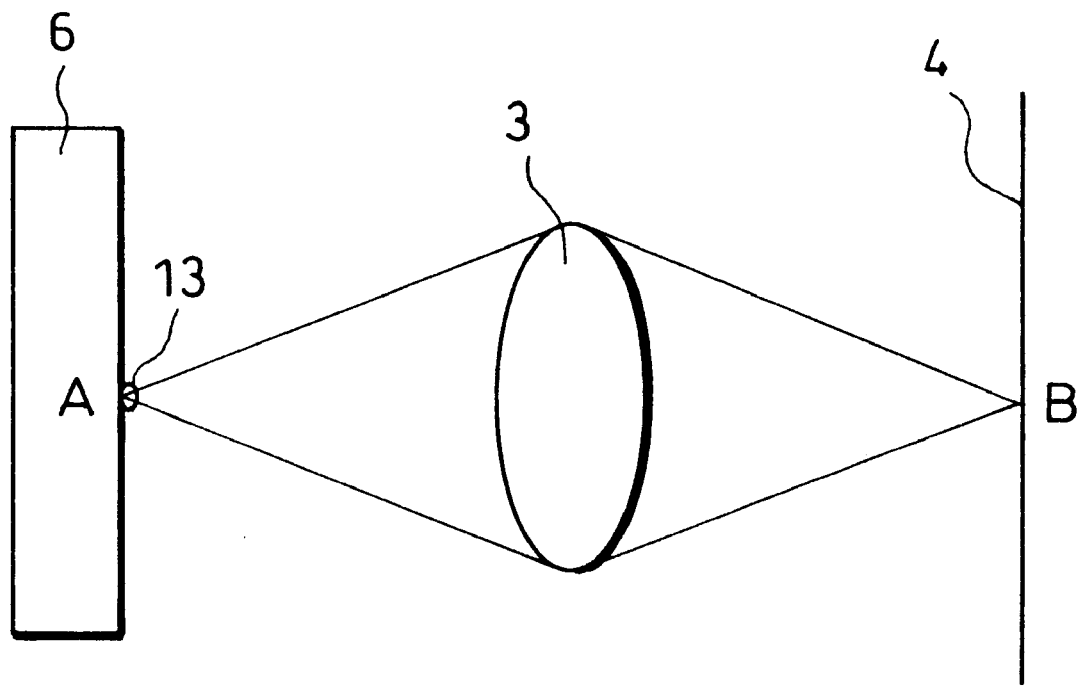
FIG. 4(a) is a view explaining a state where an image of dust adhering onto the surface of a liquid crystal layer is formed on a printing paper.
Figure 4B:
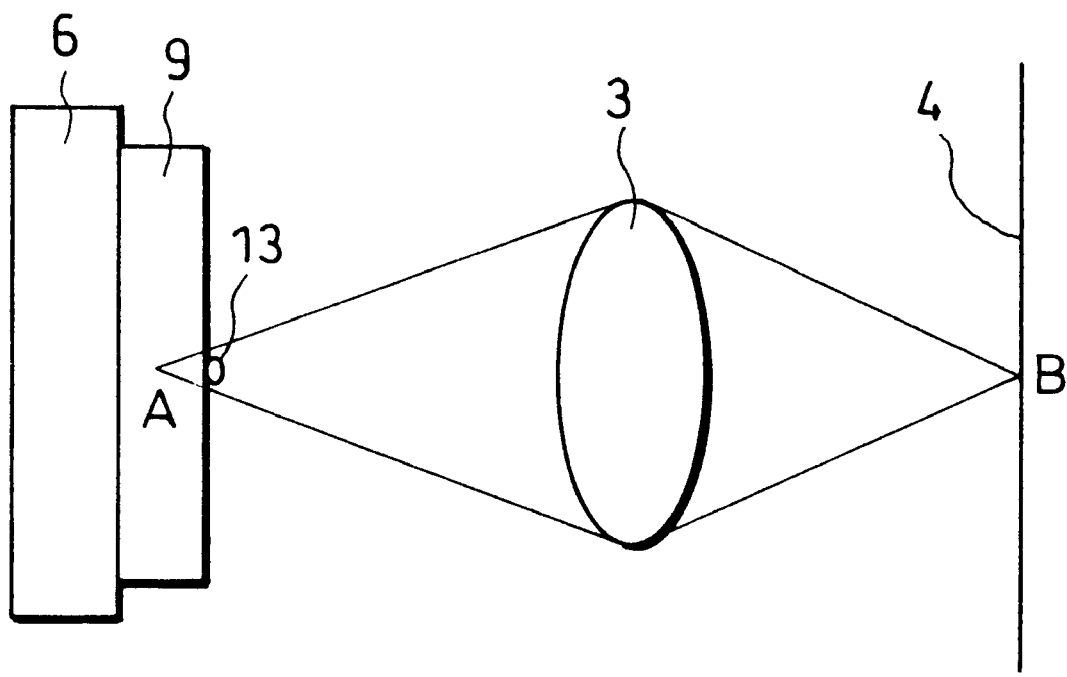
FIG. 4(b) is a view explaining a state where, by covering the surface of the liquid crystal layer with a glass plate, dust adheres to the glass plate so that an image of the dust is not readily formed.

As shown in FIG. 4(*a*), assume that an image displayed at a display position A on the liquid crystal layer 6 is focused on an image forming point B on the printing paper 4. Then, if dust 13 adheres to the liquid crystal layer 6, the display position A is in close proximity with the adhesion position of the dust 13. Thus, an image corresponding to the dust 13 is formed at the image forming point B, thereby deteriorating image quality.

However, as shown in FIG. 4(*b*), if the liquid crystal layer 6 is covered with the glass plate 9 at the image display side, the display position A of the display image is shifted toward the printing paper 4 within the glass plate 9 from the position specified in FIG. 4(*a*) due to the refraction of the glass plate 9. In this case, because the dust 13 adheres to the surface of the glass substrate 9, the adhesion point of the dust 13 and the display position A of the display image do not coincide. This state is equal to a state where the dust 13 is not focused, and the image corresponding to the dust 13 appears blurred on the printing paper 4. Consequently, by providing the glass plate 9, deterioration of the quality of the printed out image caused by the dust 13 can be prevented as much as possible. Moreover, because the glass plate 9 is allowed to rotate, it becomes more difficult to print out the image corresponding to the dust 13.

In the present embodiment, as shown in FIGS. 2(*a*) and 2(*b*), because the liquid crystal layer 6 is housed in the box 10, dust adheres to the side face of the box 10 which is spaced apart from the liquid crystal layer 6. Therefore, the adhesion position of dust is shifted from the display position of the display image on the liquid crystal layer 6 corresponding to the focused image in a reliable manner. Thus, the arrangement of the present embodiment can avoid the adverse effect of the dust without providing the glass substrate 9. However, by further providing the glass plate 9 at a position spaced apart from the liquid crystal layer 6, the adhesion position of dust can be moved farther away from the liquid crystal layer 6, thereby ensuring the foregoing effect.

The polarizing plates 5 and 7 are provided respectively on the opposing side faces of the box 10 somewhere in the optical path linking the lamp 1 and printing paper 4, and the four components, including the polarizing plates 5 and 7, double refracting plate 8, and glass plate 9, are allowed to rotate around the optic axis together as one unit.

It should be appreciated, however, that the above arrangement can be modified in various manners. For example, the double refracting plate 8 may be provided on the side face of the box 10 and the polarizing plate 7 may be installed in the interior of the box 10. Alternatively, the glass plate 9 may be provided on the side face of the box 10 and the polarizing plate 7 and double refracting plate 8 may be installed in the interior of the box 10.

Figure 2A:
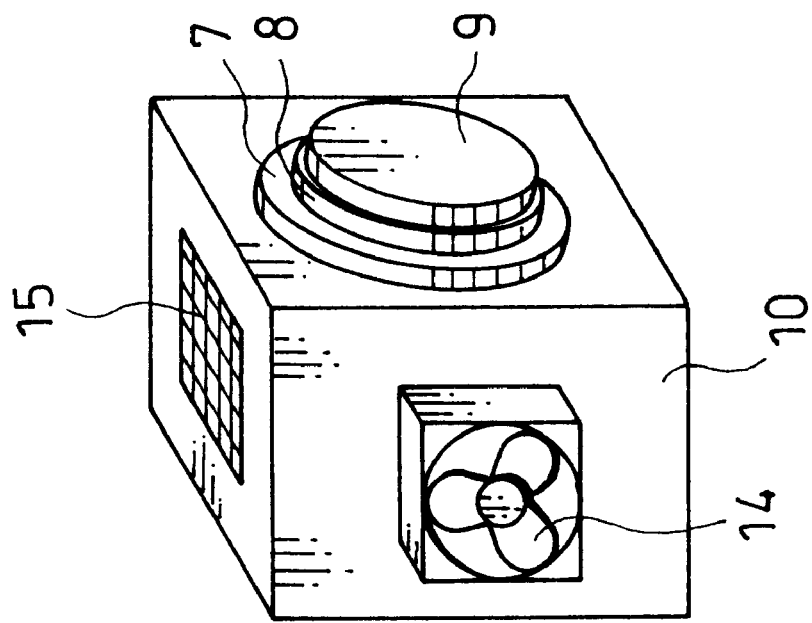
FIG. 2(a) is a perspective view showing an outward appearance of a light control section of the photograph printing device.

Also, as shown in FIG. 2(a), the two side faces of the box 10 are not provided with the polarizing plates 5 and 7, but respectively provided with a suction fan 14 (ventilation means) which lets air inside the box 10 out and a dust-proof filter 15 (dust-proof means) which blocks dust. Accordingly, by turning the suction fan 14, the interior of the box 10 can be cooled while preventing dust and dirt from entering into the same by means of the dust-proof filter 15.

Next, the following will explain an operation of the above-arranged photograph printing device when effecting the pixel displacement.

Initially, the lamp 1 is lit while the polarizing plates 5 and 7, double refracting plate 8, and glass plate 9 are not rotated but fixed to their respective positions, whereby the first print out is completed. Of all the beams of randomly polarized light emitted from the lamp 1, only the light having the same polarizing direction as that of the polarizing plate 5 passes through the same and reaches the liquid crystal layer 6. In the liquid crystal layer 6, supply of light to the printing paper 4 through each pixel is controlled in accordance with image data, and light having passed through the liquid crystal layer 6 reaches the polarizing plate 7.

On the other hand, only the light having the same polarizing direction as the splitting direction of the double refracting plate 8 passes through the polarizing plate 7 and reaches the double refracting plate 8. Then, the light is refracted by the double refracting plate 8 and reaches the printing paper 4 through the printing lens 3. A substantially square area P1 shown in FIG. 5(a) schematically represents an area printed out onto the printing paper 4 as a pixel corresponding to a particular pixel in the liquid crystal layer 6 by the first print out.

A substantially square area S1 shown in FIG. 5(a) schematically represents a virtual area which would be printed out onto the printing paper 4 if the incident light is not refracted by the double refracting plate 8 and so the light having the same optic axis as that of the incident light reaches the printing paper 4 (in other words, light is not actually irradiated to the area S1 herein). The foregoing reveals that, in the present embodiment, an image which was to be printed out in the area S1 is displaced and printed out in the area P1 of the same size.

Then, the polarizing plates 5 and 7, double refracting plate 8, and glass plate 9 are rotated by 90 degrees and fixed thereto, after which the second print out is effected in the same manner as above. Here, the particular pixel in the liquid crystal layer 6 is driven in accordance with interpolation data of the image data used in the first print out (image data corresponding to adjacent light), and hence, passing of light is controlled based on the interpolation data. Consequently, a printed out image by the second print out is formed in an area P2, which is a position of the area P1 rotated by 90 degrees with resect to the area S1.

Thereafter, the third and fourth print outs are effected in the same manner as above except that the polarizing plates 5 and 7, double refracting plate 8, and glass plate 9 are rotated by 90 degrees and fixed thereto each time, while the image data are updated optionally when a high-definition image is desired. Areas P3 and P4 schematically show areas printed out onto the printing paper 4 as the pixels corresponding to the specific pixel by the third and fourth print outs, respectively.

As has been discussed, by rotating at least the polarizing plate 7 and double refracting 8 together as one unit, and irradiating light to the printing paper 4 at different irradiating positions by refracting incident light, density of pixels on the printing paper 4 for the particular pixel in the liquid crystal layer 6 can be increased while the liquid crystal layer 6 and printing paper 4 are fixed to their original positions. Consequently, attained resolution is nearly as high as the one obtained in the case (FIGS. 17(a) through 17(d)) of the pixel displacement where the image display device or photosensitive material is displaced relatively with the other.

Hence, according to the arrangement of the present embodiment, a driving device or mechanism to displace the position of the liquid crystal layer 6 can be omitted, and therefore, no mechanical impact is applied to the liquid crystal layer 6. In addition, because it is not necessary to displace the printing sheet 4, not only a sheet paper, but also a roll of paper can be readily used. Further, because expensive position determining means, such as a piezo actuator, used to displace a position of the image display device or photosensitive material, can be omitted, the cost of the device is reduced.

Also, by updating the image data corresponding to light irradiated to the printing paper 4 through the particular pixel in the liquid crystal layer 6 in each exposure, each of the printed out pixels on the printing paper 4 for that particular pixel in the liquid crystal layer 6 can be printed out in accordance with different image data. Consequently, in comparison with a case where the particular pixel in the liquid crystal layer 6 is driven by the same image data in each exposure, a high-definition image can be printed out.

In the present embodiment, the image data corresponding to the refracted light exiting from the double refracting plate 8 is used as the interpolation data of the image data corresponding to adjacent light. However, the arrangement is not limited to the foregoing. For example, image data four times as dense as the image data used in case of not using the double refracting plate 8 may be used for the particular pixel. This case may be more preferable, because resolution can be improved in a reliable manner in comparison with the case of using the interpolation data.

Also, as shown in FIG. 5(b), given that Q1 is an intersection of two diagonals in the area S1, and Q2 is an intersection of two diagonals in the area P1, then if a distance between Q1 and Q2 is half the diagonal of the area S1, the areas P1 through P4 can be formed in the most proximate manner. In this case, dots are not noticeable on the printed out image. In order to attain such an effect, the thickness (m) of the double refracting plate 8 only has to be set in accordance with the distance between Q1 and Q2. In other words, one only has to set the thickness (m) of the double refracting plate 8 in such a manner that areas irradiated by light through the particular pixel in the liquid crystal layer 6 are formed adjacently.

In the present embodiment, the double refracting plate 8 is used as the refracting member. However, the arrangement is not limited to the foregoing. For example, the refracting member may be composed of a plurality of prisms.

(Embodiment 2)

Referring to FIG. 6, the following description will describe another embodiment of the present invention. Hereinafter, like components are labeled with like reference numerals with respect to Embodiment 1, and the description of these components is not repeated for ease of explanation. Also, the glass plate 9 and box 10 discussed in Embodiment 1 are not shown in the drawings which will be referred to in the present and following embodiments for simplification.

The photograph printing device of the present embodiment is of the same arrangement as its counterpart in Embodiment 1 except that the light control section 2 (see FIG. 1) is replaced with a light control section 16 of FIG. 6. The light control section 16 is composed of an LCD 17 and double refracting means 18 (light irradiation control means).

The LCD 17 (light modulation element) is composed of the liquid crystal layer 6 of Embodiment 1 (see FIG. 1) and polarizing plates respectively provided to the light-incident side and light-exit side of the liquid crystal layer 6, and serves as the image display device in the same manner as the liquid crystal layer 6. In the LCD 17, because the liquid crystal layer 6 and the two polarizing plates are formed as one unit, neither of the two polarizing plates is allowed to rotate as was in Embodiment 1.

The double refracting means 18 double refracts incident light into an ordinary ray which travels along a straight optic axis and an extraordinary ray which travels along a refracted optic axis, so as to irradiate only the extraordinary ray on the printing paper 4 at different irradiation positions. Thus, the double refracting means 18 includes a ¼ wavelength plate 19, the double refracting plate 8, and a polarizing plate 20, which are positioned sequentially in this order along the direction of light exiting from the LCD 17.

The double refracting plate 8 is a splitting element which splits exit light from the LCD 17 into an ordinary ray and an extraordinary ray as shown in FIG. 3. In other words, unlike Embodiment 1, two beams of light having their respective optic axes are obtained by means of the double refracting plate 8 in the present embodiment.

The ¼ wavelength plate 19 is a converting element which converts linearly polarized light from the LCD 17 to circularly polarized light and supplies the same to the double refracting plate 8. By providing such a converting element to the double refracting plate 8 at the light-incident side, the extraordinary ray can be obtained by the double refracting plate 8 in a secure manner, thereby making it possible to effect the pixel displacement in a stable manner as was in Embodiment 1. The reason why is as follows.

Assume that the incident light on the double refracting plate 8 is linearly polarized light that oscillates in a specific direction. Then, if this linearly polarized light is the one which includes both a first component along the splitting direction of the double refracting plate 8 and a second component in a direction perpendicular to the splitting direction when decomposed into two directions, the first component exits as the extraordinary ray and the second component exits as the ordinary ray from the double refracting plate 8. In this case, the pixel displacement can be effected without any problem, because the extraordinary ray is obtained.

In addition, for example, in case that the linearly polarized light incident on the double refracting plate 8 is the light that oscillates only in the splitting direction of the double refracting plate 8, the ordinary ray does not exit and only the extraordinary ray exits from the double refracting plate 8, because such light does not include the component which oscillates in the direction perpendicular to the splitting direction. Accordingly, even if the light that oscillates only in the splitting direction of the double refracting plate 8 is incident on the same, the pixel displacement using the extraordinary ray can be effected without any problem.

However, in case that the linearly polarized light incident on the double refracting plate 8 is the light that oscillates only in the direction perpendicular to the splitting direction of the double refracting plate 8, the extraordinary ray does not exit and only the ordinary ray exits from the double refracting plate 8, because such light does not include the component that oscillates in the splitting direction. Thus, the pixel displacement using the extraordinary ray can not be effected in this case.

Thus, by providing the ¼ wavelength plate 19 and supplying circularly polarized light to the double refracting plate 8 like in the present embodiment, the extraordinary ray can be obtained by the double refracting plate 8 in a secure manner, because the circular polarizing light invariably includes at least the component in the oscillating direction of the extraordinary ray when split into the oscillating direction of the extraordinary ray and that of the ordinary ray. Consequently, the pixel displacement using the extraordinary ray can be effected in a reliable manner.

The polarizing plate 20 (polarizing element) is an element which blocks the ordinary ray and transmits only the extraordinary ray both exiting from the double refracting plate 8. The polarizing plate 20 is fixed to the double refracting plate 8 in such a manner that the polarizing direction of the polarizing plate 20 is the same as that of the extraordinary ray while being allowed to rotate together with the double refracting plate 8. Accordingly, if the double refracting plate 8 rotates, only the extraordinary ray can be irradiated to the printing paper 4 through the polarizing plate 20.

The following will explain an operation of the photograph printing device of the present embodiment.

Initially, the lamp 1 is lit while the double refracting plate 8 and polarizing plate 20 are fixed to their respective positions. When light emitted from the lamp 1 reaches the LCD 17, supply of light to the printing paper 4 through each pixel is controlled by the LCD 17 in accordance with the image data. Then, linearly polarized light exits from the LCD 17 and reaches the ¼ wavelength plate 19.

The linearly polarized light incident on the ¼ wavelength plate 19 is converted to circularly polarized light by the ¼ wavelength plate 19, and split into the ordinary ray and extraordinary ray by the double refracting plate 8. Of these two kinds of rays, the ordinary ray does not reach the printing paper 4 because it is blocked by the polarizing plate 20, but the extraordinary ray passes through the polarizing plate 20 and reaches the printing paper 4 through the printing lens 3. Consequently, as shown in FIGS. 5(*a*) and 5(*b*), an image corresponding to a particular pixel in the LCD 17 is printed out in the area P1 which is shifted by a predetermine quantity from the area S1 to which the ordinary ray was to be irradiated, whereby the first print out is completed.

Then, the double refracting plate 8 and polarizing plate 20 are rotated around the optic axis by 90 degrees from their respective positions in the first print out, and the image data corresponding to the particular pixel in the LCD 17 is updated optionally, after which the second print out is effected in the same manner as above. In this case, an image corresponding to the particular pixel in the LCD 17 is printed out in the area P2.

Thereafter, the third and fourth print outs are effected by rotating the double refracting plate 8 and polarizing plate 20 by 90 degrees and fixed thereto each time, while updating the image data optionally. Consequently, images corresponding to the particular pixel in the LCD 17 are printed out in the areas P3 and P4, respectively.

As has been discussed, by effecting the exposure four times by rotating the double refracting plate 8 and polarizing plate 20 by 90 degrees while updating the image data optionally each time, the print out illustrated in FIG. 5(*a*) or 5(*b*) can be effected with the extraordinary ray corresponding to the refracted light in Embodiment 1. Consequently, an effect similar to that of Embodiment 1 can be attained by the pixel displacement similar to that in Embodiment 1.

(Embodiment 3)

Referring to FIGS. 7 through 10(*b*), the following description will describe still another embodiment of the present invention. Hereinafter, like components are labeled with like reference numerals with respect to Embodiments 1 and 2, and the description of these components is not repeated for ease of explanation.

Figure 7:
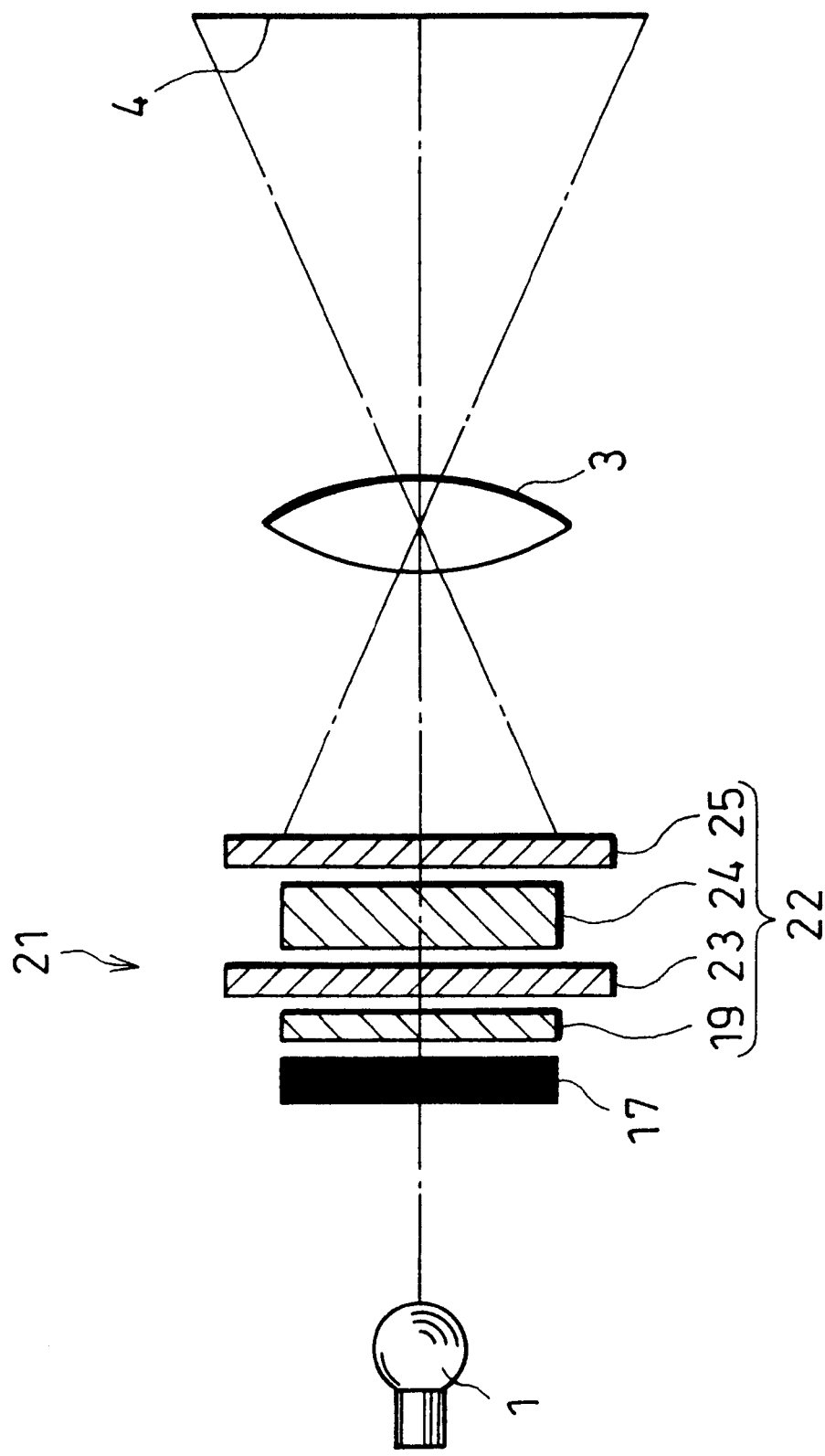
FIG. 7 is a cross section schematically showing an arrangement of a photograph printing device in accordance with a further embodiment of the present invention.

The photograph printing device of the present embodiment is of the same arrangement as its counterpart in Embodiment 2 except that the light control section 16 (see FIG. 6) is replaced with a light control section 21 of FIG. 7. The light control section 21 is composed of the LCD 17 and double refracting means 22 (light irradiation control means).

The double refracting means 22 is composed of the ¼ wavelength plate 19, a polarizing plate 23, a 4-point-splitting double refracting filter (hereinafter, referred to simply as double refracting filter) 24, and another polarizing plate 25, which are positioned sequentially in this order along the direction of light exiting from the LCD 17.

As shown in FIG. 8(*b*), the double refracting filter 24 (splitting element) is composed of a double refracting plate 26, a ¼ wavelength plate 27, and another double refracting plate 28, which are positioned sequentially in this order along the direction of light. Unlike Embodiments 1 and 2, the double refracting filter 24 is not allowed to rotate around the optic axis and fixed to a specific position.

Each of the double refracting plates 26 and 28 is a splitting element similar to the double refracting plate 8 (see FIG. 1), which splits incident light into an ordinary ray which travels along a straight optic axis and an extraordinary ray which travels along a refracted optic axis. The double refracting plates 26 and 28 are positioned in such a manner that their respective splitting directions are perpendicular to each other. In FIG. 8(*b*), the splitting direction of the double refracting plate 26 is vertical, and for this reason, a beam of light incident on the double refracting plate 26 is spilt into two beams of light having their respective optic axes as projected onto a perpendicular plane in FIG. 8(*a*). Also, because the splitting direction of the double refracting plate 28 is horizontal, a beam of light incident on the double refracting plate 28 is also split into two beams of light having their respective optic axes as projected onto a horizontal plane in FIG. 8(*c*). Thus, in case that neither the polarizing plate 23 nor 25 is provided, light incident on the double refracting filter 24 is split (double refracted) into four beams of light having their respective optic axes.

The ¼ wavelength plate 27 is a converting element which converts incident light from the double refracting plate 26 into circularly polarized light. By providing the ¼ wavelength plate 27 to the double refracting plate 28 at the light-incident side, the incident light on the double refracting plate 28 constantly includes the component in the splitting direction of the double refracting plate 28 and the component perpendicular to that direction, thereby making it possible to split the incident light on the double refracting plate 28 into two beams of light having their respective optic axes.

Hereinafter, of the four beams of light exiting from the double refracting plate 28, light having the same optic axis as that of incident light on the double refracting plate 26 (light having the optic axis ④) is referred to as the ordinary ray, and others (light having the optic axes ①–③) as the extraordinary rays. Thus, in the present embodiment, one ordinary ray and three extraordinary rays can be obtained by the double refracting filter 24. In FIG. 8(*b*), arrows drawn on the optic axes ①–④ represent the oscillating directions of light.

The polarizing plate 23 (first limiting means, polarizing element) and the polarizing plate 25 (second limiting means, polarizing element) shown in FIG. 7 limit the incident light on the double refracting filter 24 and exit light from the same in such a manner that only a single beam of light in the specific polarizing direction or having the specific optic axis is taken out and selectively irradiated to the printing paper 4. Each of the polarizing plates 23 and 25 is allowed to rotate, so that their respective polarizing directions can be adjusted separately.

Here, in FIGS. 9(*a*) through 9(*d*), assume that the splitting direction of the double refracting plate 26 is vertical, and that of the double refracting plate 28 is horizontal, and the double refracting filter 24 is provided between the polarizing plates 23 and 25. Also, assume that light reaches the polarizing plate 23 from the opposite side to the polarizing plate 25, and exits from the polarizing plate 25 toward the opposite side to the polarizing plate 23.

For example, as shown in FIG. 9(*a*), in case that the polarizing plate 23 is fixed in such a manner that its polarizing direction is perpendicular to the splitting direction of the double refracting plate 26, and the polarizing plate 25 is fixed in such a manner that its polarizing direction is also perpendicular to the splitting direction of the double refracting plate 28, of all the beams of light incident on the polarizing plate 23, only the light having the same optical axis as the optical axis ④ is irradiated to the printing paper 4 for the following reason.

Because only the light having the same polarizing direction as that of the polarizing plate 23 reaches the double refracting plate 26, the ordinary rays having the above polarizing direction exits from the double refracting plate 26, and no extraordinary ray exits from the same. This means that light having the optic axes ① and ② shown in FIG. 8(*b*) does not exit from the double refracting plate 28. Then, of the two beams of light exiting from the double refracting plate 28, only the light that oscillates in the polarizing direction of the polarizing plate 25 can pass through the same. Therefore, light having the optic axis ③ which is different from the polarizing direction of the polarizing plate 25 is blocked by the polarizing plate 25. Hence, when the polarizing plates 23 and 25 are fixed as shown in FIG. 9(*a*), only the light having the optic axis ④ can pass through the polarizing plate 25 and reach the printing paper 4.

In accordance with the foregoing principle, as shown in FIG. 9(*b*), when the polarizing plate 23 is fixed in such a manner that its polarizing direction is perpendicular to the splitting direction of the double refracting plate 26, and the polarizing plate 25 is fixed in such a manner that its polarizing direction is parallel to the splitting direction of the double refracting plate 28, only the light having the optic axis ③ is irradiated to the printing paper 4. Also, as shown in FIG. 9(c), in case that the polarizing plate 23 is fixed in such a manner that its polarizing direction is parallel to the splitting direction of the double refracting plate 26, and the polarizing plate 25 is fixed in such a manner that its polarizing direction is perpendicular to the splitting direction of the double refracting plate 28, only the light having the optic axis ① is irradiated to the printing paper 4. Also, as shown in FIG. 9(d), in case that the polarizing plate 23 is fixed in such a manner that its polarizing direction is parallel to the splitting direction of the double refracting plate 26, and the polarizing plate 25 is fixed in such a manner that its polarizing direction is also parallel to the splitting direction of the double refracting plate 28, only the light having the optic axis ② is irradiated to the printing paper 4.

In other words, by rotating the polarizing plates 23 and 25 separately and fixing the same at the positions specified in FIGS. 9(a) through 9(d), beams of light having their respective optic axes can be irradiated one by one to the printing paper 4. Thus, the double refracting means 22 having at least the polarizing plates 23 and 25 and double refracting filter 24 forms light irradiation control means which generates more than one beam of light, each having a different optic axis, from a single beam of light exiting from the specific pixel in the LCD 17, and irradiates each beam of light thus generated to the printing paper 4 at different timing.

According to the above arrangement, by positioning the polarizing plates 23 and 25 separately and sequentially as shown in FIGS. 9(a) through 9(d), and effecting exposure by updating the image data for the particular pixel in the LCD 17 each time, the density of pixels formed on the printing paper 4 for the particular pixel can be increased four times as was in Embodiments 1 and 2. Consequently, the present embodiment can attain the same effect as that attained in Embodiments 1 and 2.

In the foregoing, the polarizing plates 23 and 25 were allowed to rotate separately. However, the polarizing plates 23 and 25 are not necessarily rotatory. For example, each of the polarizing plates 23 and 25 may be allowed to slide, so that each of the polarizing plates 23 and 25 is slid into their respective positions so as to have the polarizing directions shown in FIGS. 9(a) through 9(d).

The present embodiment explained an example case where the ¼ wavelength plate 19 is provided to the LCD 17 at the light-exit side. However, the ¼ wavelength plate 19 can be omitted by setting the angle of polarization of the polarizing plate installed inside the LCD 17 to adequate degrees with respect to the optic axis.

Assume that a typical LCD 17 is composed of, as shown in FIG. 10(a), the liquid crystal layer 6, and polarizing plates 29 and 30, which are provided respectively to the light-incident side and light-exit side of the liquid crystal layer 6 and whose polarizing directions respectively match with the splitting direction of the double refracting plate 26 and the direction perpendicular to the same. For example, as shown in FIG. 10(b), the LCD 17 only has to include polarizing plates 31 and 32 which are, in effect, the polarizing plates 29 and 30 whose polarizing directions are inclined by 45 degrees with respect to the optic axis. In this case, the linearly polarized light exiting from the polarizing plate 32 includes the component in the splitting direction of the double refracting plate 26 and the component in the direction perpendicular to the splitting direction in a secure manner, both the ordinary and extraordinary rays can be generated by the double refracting plate 26 constantly. Thus, the ¼ wavelength plate 19 is no longer necessary. That is, one only has to set the polarizing direction of the polarizing plates 31 and 32 so as to be different from the splitting direction of the double refracting member (double refracting plate 26), at which the light having passed through the polarizing plate 23 reaches first.

The angle of the polarizing direction of the polarizing plates 31 and 32 with respect to the optic axis is not necessarily 45 degrees. However, in order to obtain the ordinary rays and extraordinary rays in good balance by the double refracting plate 26, it is preferable to set the angle to 45 degrees.

In the present embodiment, the double refracting filter 24 includes two double refracting plates. However, the double refracting filter 24 can include more than two double refracting plates, so that incident light can be split into more than four directions.

(Embodiment 4)

Figure 11:
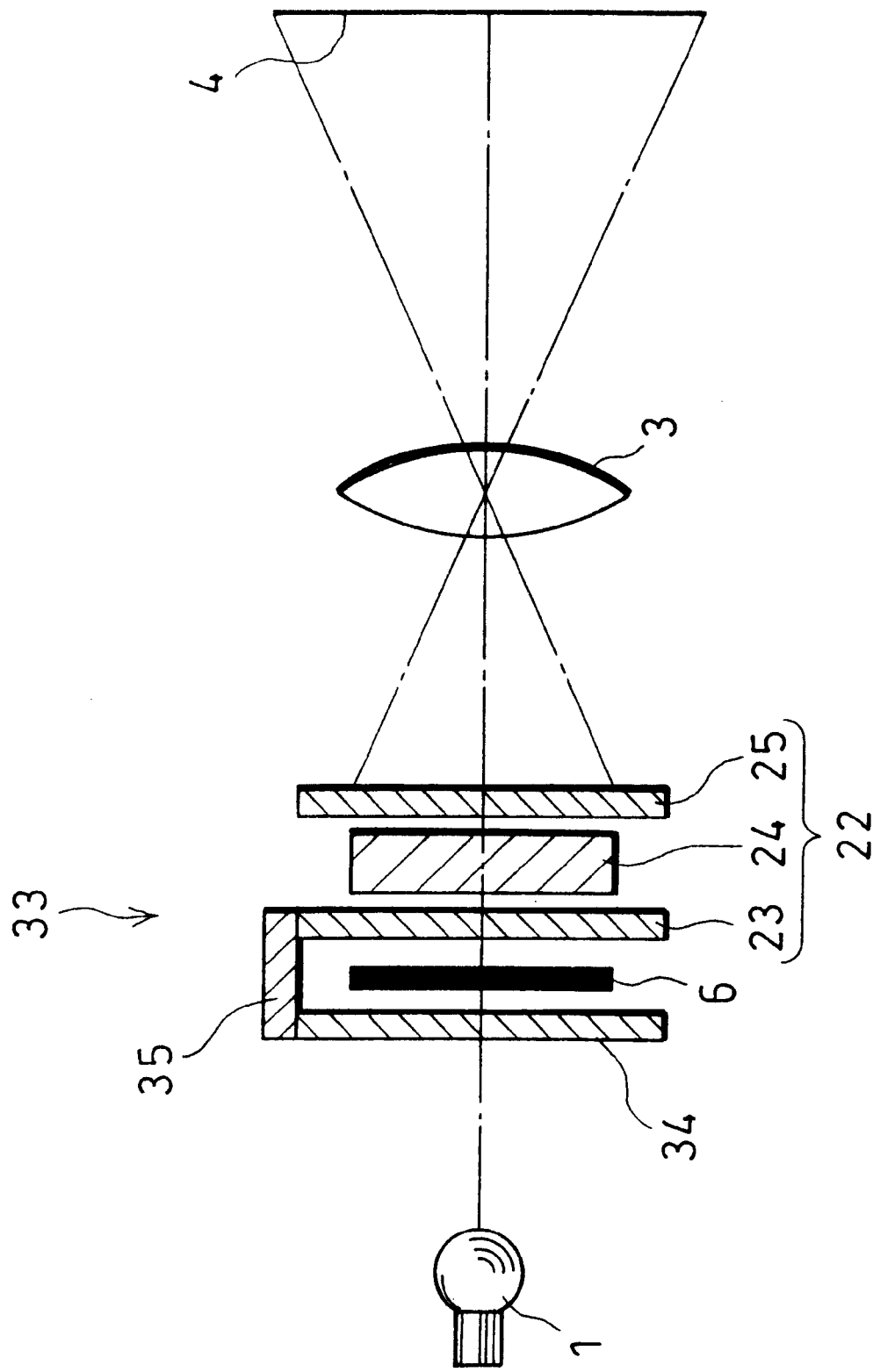
FIG. 11 is a cross section schematically showing an arrangement of a photograph printing device in accordance with still another embodiment of the present invention.

Referring to FIG. 11, the following description will describe still another embodiment of the present invention. Hereinafter, like components are labeled with like reference numerals with respect to Embodiments 1 through 3, and the description of these components is not repeated for ease of explanation.

The photograph printing device of the present embodiment is of the same arrangement as its counterpart in Embodiment 3 except that the light control section 21 (see FIG. 7) is replaced with a light control section 33 of FIG. 11. The light control section 33 is composed of the double refracting means 22 discussed in Embodiment 3 (however, the ¼ wavelength plate 19 is omitted herein), the liquid crystal layer 6 provided to the double refracting means 22 at the light-incident side, and a polarizing plate 34 which allows, of all the beams of light emitted from the lamp 1, only the light having a specific polarizing direction to reach the liquid crystal layer 6. The polarizing plate 34 and the polarizing plate 23 of the double refracting means 22 are linked to each other by means of a linking member 35, and allowed to rotate together as one unit.

Like in Embodiment 1, the polarizing plates 34 and 23 are aligned in such a manner that their respective polarizing directions cross at right angles if the liquid crystal layer 6 is in the normally white mode, and become parallel to each other in the normally black mode.

In the present embodiment, because the polarizing plate 23 of the double refracting means 22 also serves as the polarizing plate provided to the light-exit side of the LCD 17 of Embodiment 3 (see FIG. 7), the ¼ wavelength plate 19 which was indispensable in Embodiment 3 can be omitted.

Moreover, the double refracting means 22 includes the polarizing plate 23, double refracting filter 24 and polarizing plate 25 used in Embodiment 3. Thus, by positioning the polarizing plates 23 and 25 separately and sequentially in the manners shown in FIGS. 9(a) through 9(d), and effecting exposure by updating the image data for the particular pixel in the liquid crystal layer 6 each time, an effect similar to that attained in Embodiment 3 can be attained.

In the present embodiment, three polarizing plates were used in total. Hence, in comparison with Embodiment 3 which uses four polarizing plates in total (including two polarizing plates forming the LCD 17), one polarizing plate can be omitted. Thus, by using fewer polarizing plates, the present embodiment can improve light utilization compared with Embodiment 3.

(Embodiment 5)

Referring to FIGS. 12 through 15(b), the following description will describe still another embodiment of the present invention. Hereinafter, like components are labeled with like reference numerals with respect to Embodiments 1 through 4, and the description of these components is not repeated for ease of explanation.

Figure 12:
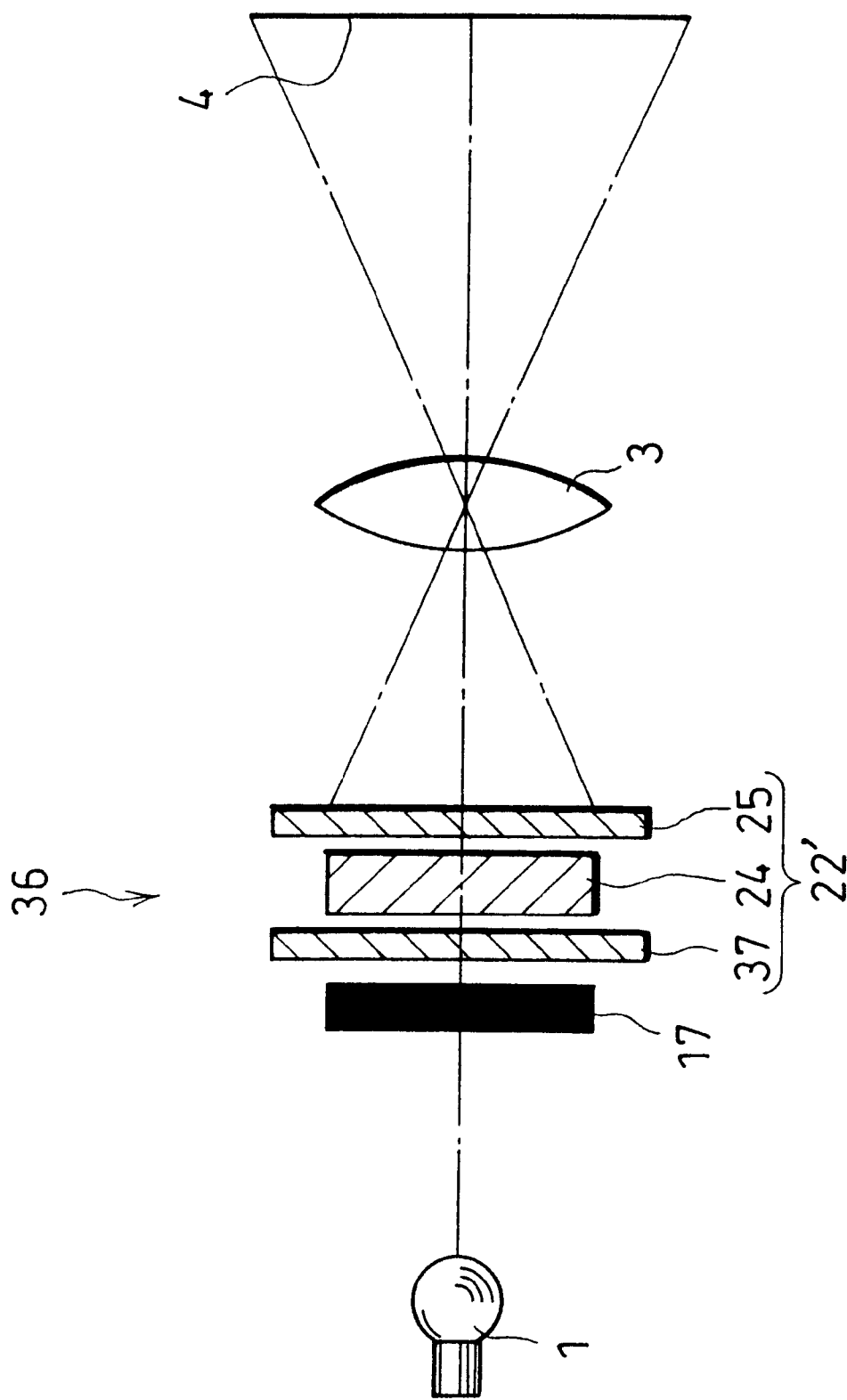
FIG. 12 is a cross section schematically showing an arrangement of a photograph printing device in accordance with still another embodiment of the present invention.
Figure 13:
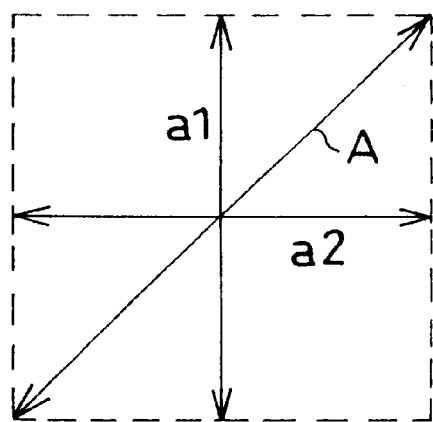
FIG. 13(a) is a view explaining a relation between incident light on the polarizing plate and exit light from the same.
FIG. 13(b) is a view explaining a relation between incident light on the liquid crystal layer and exit light from the same.
Figure 13:
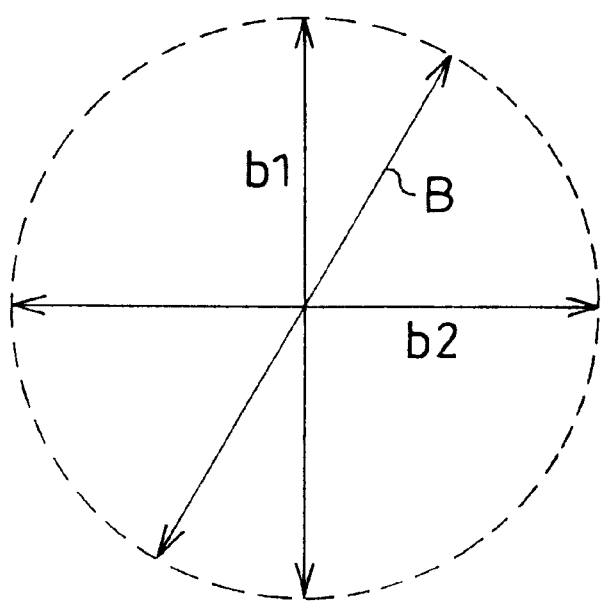

The photograph printing device of the present embodiment is of the same arrangement as its counterpart in Embodiment 3 except that the light control section 21 (see FIG. 7) is replaced with a light control section 36 of FIG. 12. The light control section 36 is composed of the LCD 17 and double refracting means 22'. The double refracting means 22' is of the same arrangement as the double refracting means 22 of Embodiment 3 except that the ¼ wavelength plate 19 and polarizing plate 23 (see FIG. 7) are replaced with a liquid crystal layer 37 (first limiting means, modulating member) which modulates exit light from the LCD 17.

In case of Embodiment 3 using the ¼ wavelength plate 19 and polarizing plate 23, as shown in FIG. 13(a), the polarizing plate 23 takes out two components from incident light A: a component a1 in the splitting direction of the double refracting plate 26 and a component a2 in the direction perpendicular to the splitting direction, and supplies the double refracting plate 26 with either of the two components a1 and a2. Thus, a quantity of light supplied to the double refracting plate 26 is reduced by a quantity of the component which was blocked by the polarizing plate 23.

However, in case of using the liquid crystal layer 37, as shown in FIG. 13(b), the oscillating direction of exit light B from the LCD 17 is twisted by the liquid crystal layer 37, and therefore, the components of the light B neither in the horizontal nor vertical direction is blocked. In addition, because the polarizing direction of exit light from the LCD 17 can be adjusted flexibly by the liquid crystal layer 37, it is no longer necessary to provide the polarizing plate 23 to guide light having a specific polarizing direction to the double refracting plate 26. In short, the liquid crystal layer 37 al so serves as the polarizing plate 23.

Thus, by replacing the ¼ wavelength plate 19 and polarizing plate 23 forming the double refracting means 22 with the liquid crystal layer 37, light b1 and light b2 having in total the same light quantity as that of the light B can be supplied to the splitting direction of the double refracting plate 26 and the direction perpendicular to the same. Consequently, light from the lamp 1 can be utilized more efficiently compared with Embodiment 3.

Figure 14:
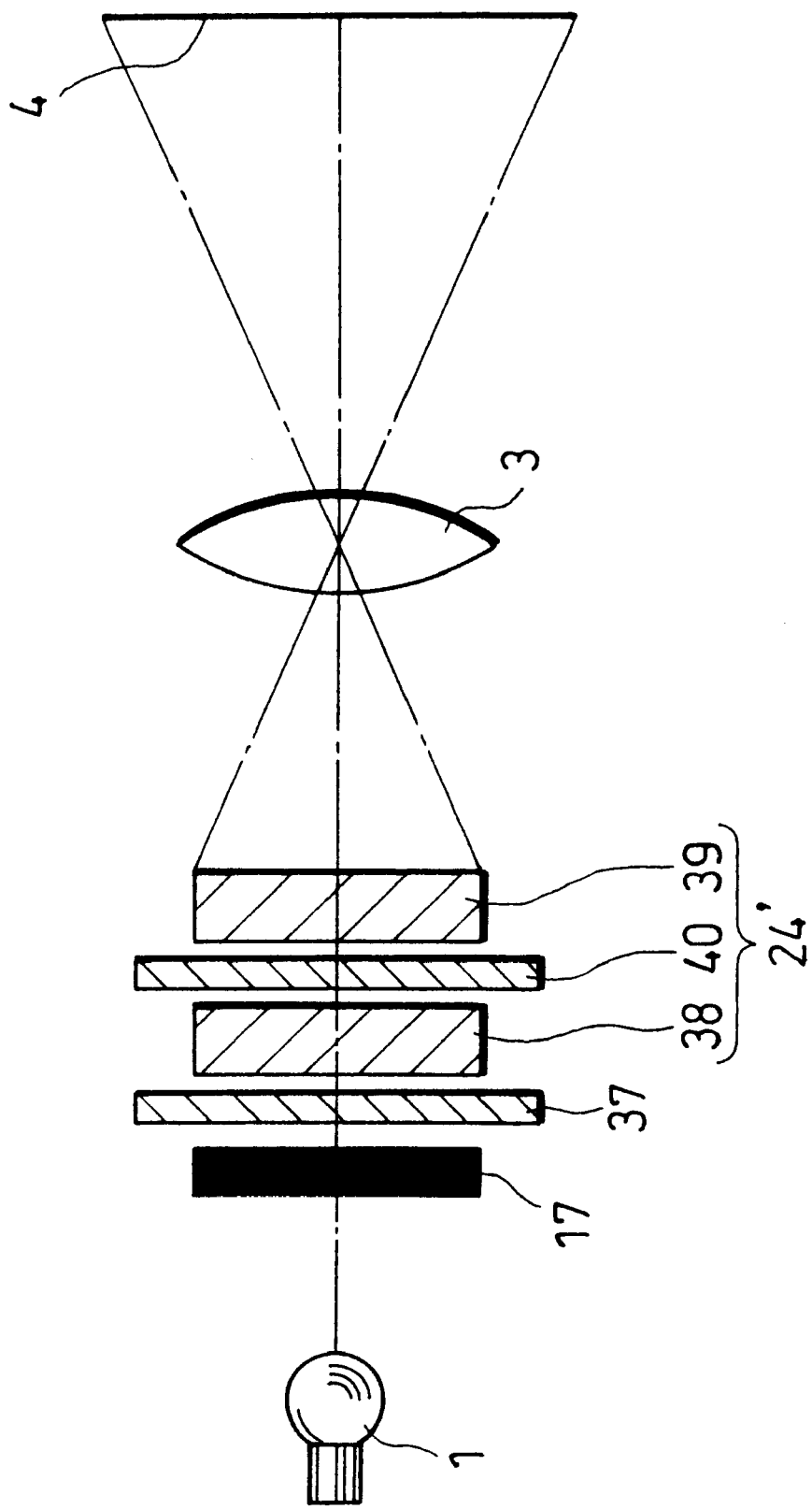
FIG. 14 is a cross section showing another arrangement of the photograph printing device.

Also, because the ¼ wavelength plate can be replaced with the liquid crystal layer furnished with the light modulating function, the double refracting filter 24 of FIG. 12 can be replaced with a double refracting filter 24' of FIG. 14, for example. The double refracting filter 24' is composed of (1) double refracting plates 38 and 39 which are the 2-point-splitting double refracting filters functioning in the same manner as the double refracting plates 26 and 28, and (2) a liquid crystal layer 40 interposed between the double refracting plates 38 and 39 and furnished with the light modulation function equivalent to that of the liquid crystal layer 37. In other words, this arrangement is the same as that of the double refracting filter 24 of FIG. 8 except that the ¼ wavelength plate 27 is replaced with the liquid crystal layer 40. Thus, with the above-arranged double refracting filter 24', no light quantity is lost at the ¼ wavelength plate, thereby making it possible to improve light utilization in a reliable manner compared with the arrangement of FIG. 8.

Figure 15A:
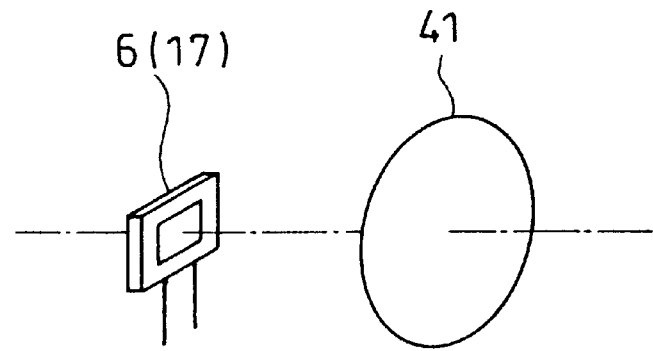
FIG. 15(a) is a perspective view showing an arrangement, in which the optic axis of the liquid crystal layer (or LCD) is matched with an axis of rotation of a rotating member.
Figure 15B:
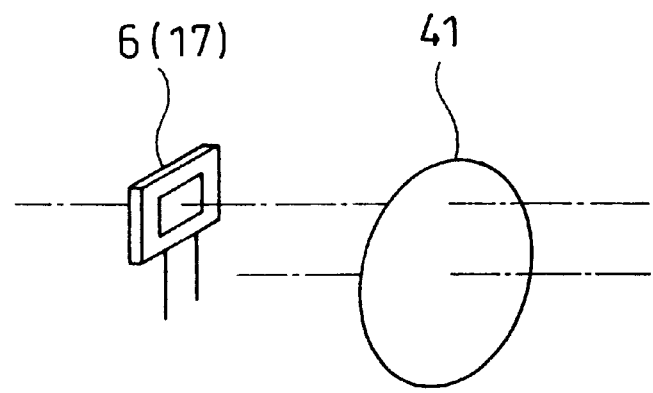
FIG. 15(b) is a perspective view showing an arrangement, in which the optic axis and the axis of rotation are displaced with respect to each other.
Figure 16A:
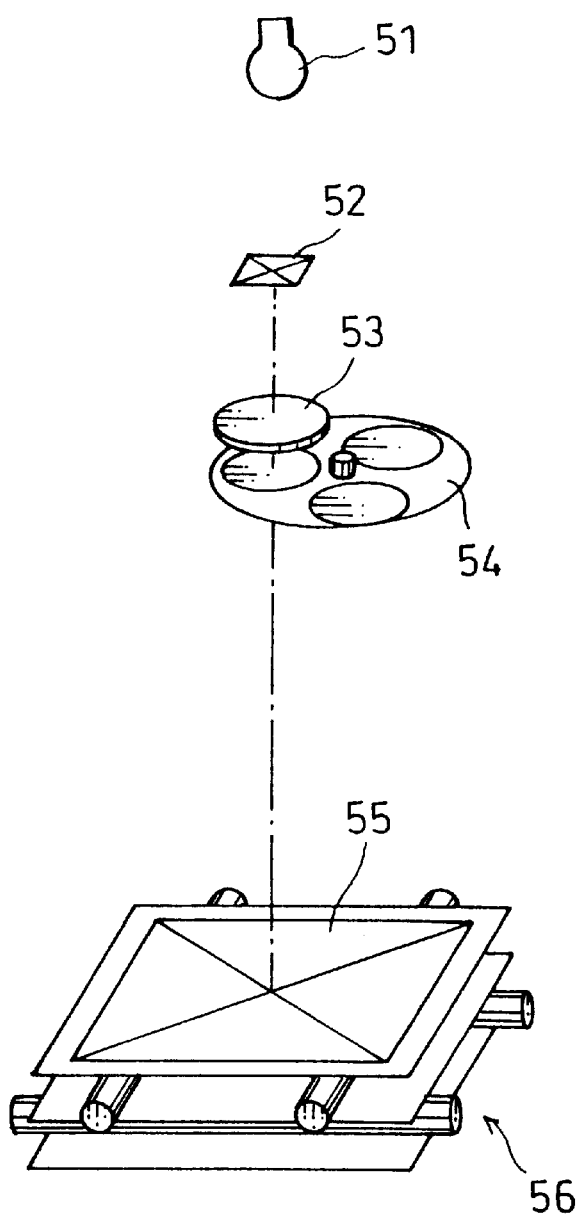
FIG. 16(a) is a perspective view schematically showing an arrangement of a conventional photograph printing device which effects the pixel displacement by displacing a printing paper with respect to a liquid crystal display.
Figure 16B:
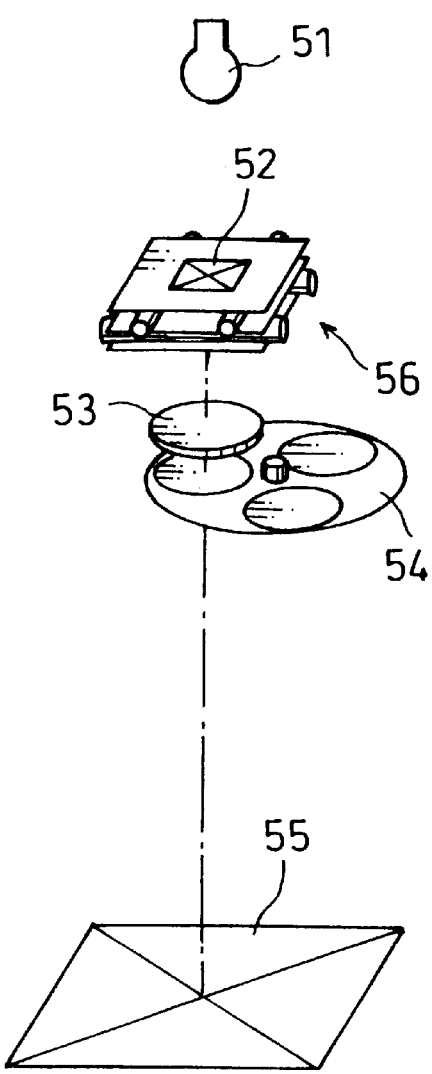
FIG. 16(b) is a perspective view schematically showing an arrangement of a conventional photograph printing device which effects the pixel displacement by displacing a liquid crystal display with respect to a printing paper.
Figure 17D:
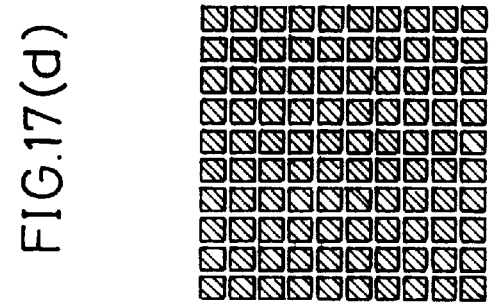
FIG. 17(d) is a view explaining pixels which form a color image printed out onto the printing paper up to the fourth exposure.
Figure 17C:
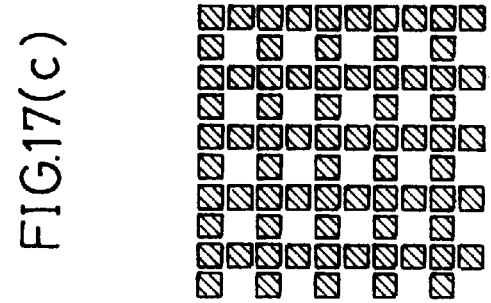
FIG. 17(c) is a view explaining pixels which form a color image printed out onto the printing paper up to the third exposure.
Figure 17B:
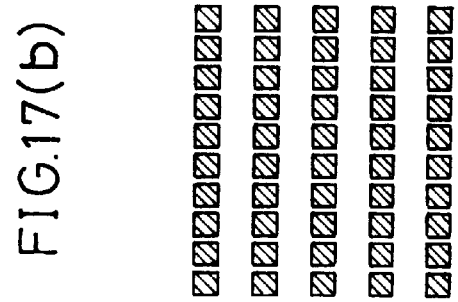
FIG. 17(b) is a view explaining pixels which form a color image printed out onto the printing paper up to the second exposure.
Figure 17A:
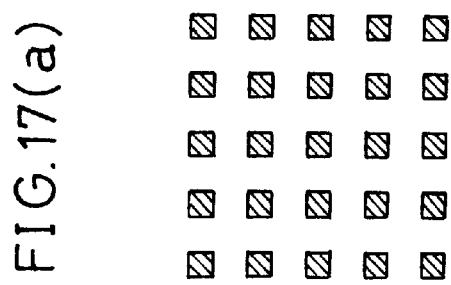
FIG. 17(a) is a view explaining pixels which form a color image printed out onto a printing paper by the first exposure.

As shown in FIG. 15(a), each of the above embodiments explained the cases where the optic axis linking the liquid crystal layer 6 (or LCD 17) and printing paper 4 is matched with the axis of rotation of a rotating member 41 (rotatable polarizing plate, double refracting plate, glass plate). It should be appreciated, however, that the optic axis and axis of rotation may be displaced (offset) with respect to each other.

For example, in case of FIG. 15(a), if dust or the like adheres around the axis of rotation on the light-exit surface of the rotating member 41, an image (shadow) corresponding to the dust is highly likely formed on the printing paper 4, because the dust stays in the same position regardless of the rotation of the rotating member 41. However, in case of FIG. 15(b) even if dust or the like adheres around the axis of rotation, it does not raise any problem, because light is not irradiated to the axis of rotation of the rotating member 41. On the other hand, even if dust or the like adheres to the light-exit surface of the rotating member 41 on the optic axis of an exposure system, a shadow corresponding to the dust is not readily printed out onto the printing paper 4, because the position of the dust varies in accordance with the rotation of the rotating member 41.

It should be appreciated that, in each of the above-explained embodiments, the pixel displacement is effected in association with the feeding of the printing paper 4. In other words, the pixel displacement in a direction perpendicular to the transportation direction of the printing paper 4 is effected in the manner as described in each of the above embodiments, and the pixel displacement along the transportation direction is effected by displacing the printing paper 4 by a quantity corresponding to half the pixel in the liquid crystal layer 6 (or LCD 17) in the transportation direction by means of feeding mechanism of the printing paper 4.

Each of the above-explained embodiments described the case where the image display device is composed of the light transmitting liquid crystal layer 6 or LCD 17. However, the arrangement is not limited to the foregoing. For example, the image display device may be composed of a reflective liquid crystal layer or LCD. Alternatively, the image display device may be composed of a DMD (Digital Micromirror Device), a PLZT exposure head, an LED (Light Emitting Diode) panel, etc.

As has been discussed, the photograph printing device of the present invention may be a photograph printing device including a light modulation element, provided with a plurality of pixels and controlling supply of light to a photosensitive material through each pixel in accordance with image data, and by irradiating light emitted from a light source to the photosensitive material through the light modulation element, printing out an image corresponding to the image data onto the photosensitive material, which is arranged to include light irradiation control means for generating, from incident light through a particular pixel in the light modulation element, a beam of light having an optic axis different from the optic axis of the incident light, and irradiating the generated beam of light to the photosensitive material at different irradiation positions.

According to the above arrangement, the light emitted from the light source through the particular pixel in the light modulation element is irradiated to the photosensitive material through the light irradiation control means. Because the light irradiation control means generates a beam of light having an optic axis different from that of the incident light at this point, light is irradiated to the photosensitive material at different positions by, for example, rotating the light thus generated around the optic axis and then irradiating the same.

Because the light irradiation control means generates, from the beam of the incident light, a beam of light having an optic axis from that of the incident light first, and thence irradiates the generated beam of light to the photosensitive material at different irradiation positions, the number of pixels on the photosensitive material corresponding to the particular pixel in the light modulation element increases with the number of irradiated beams of light without displacing the light modulation element or photosensitive material relatively with respect to the other. Consequently, attained resolution is nearly as high as the one obtained by displacing the light modulation element or photosensitive material relatively with respect to the other.

Thus, according to the above arrangement, although the pixel displacement is effected to improve resolution of a printed out image, a driving device or mechanism to displace the light modulation element or photosensitive material with respect to the other can be omitted, because the light modulation element and photosensitive material are fixed to their original positions. Consequently, an adverse effect, such as vibration, to the light modulation element can be prevented in a reliable manner, while the pixel displacement can be readily effected not only with a sheet paper, but also a roll of paper.

Also, the photograph printing device of the present invention may be a photograph printing device including a light modulation element, provided with a plurality of pixels and controlling supply of light to a photosensitive material through each pixel in accordance with image data, and by irradiating light from a light source to the photosensitive material through the light modulation element, printing out an image corresponding to the image data onto the photosensitive material, which is arranged to include double refracting means for double refracting incident light through the particular pixel in the light modulation element into an ordinary ray which travels along a straight optic axis and an extraordinary ray which travels along a refracted optic axis, so that only the extraordinary ray is irradiated to the photosensitive material at different irradiation positions.

According to the above arrangement, the light emitted from the light source through the particular pixel in the light modulation element is double refracted into the ordinary ray and extraordinary ray by the double refracting means, and only the extraordinary ray is irradiated to the photosensitive material by the function of the double refracting means. Because the extraordinary ray is the light having an optic axis refracted from that of the incident light, if the double refracting means is arranged to rotate the extraordinary ray around the optical axis of the incident light and then irradiates the same, light can be irradiated to the photosensitive material at different positions.

Because the double refracting means irradiates the extraordinary ray to the photosensitive material at different irradiation positions, the number of pixels on the photosensitive material corresponding to the particular pixel in the light modulation element increases with the number of irradiated beams of light without displacing the light modulation element or photosensitive material relatively with respect to the other. Consequently, attained resolution is nearly as high as the one obtained by displacing the light modulation element or photosensitive material relatively with respect to the other.

Thus, according to the above arrangement, the pixel displacement can be effected to improve resolution of a printed out image while the light modulation element and photosensitive material are fixed to their original positions, thereby making it possible to omit a driving device or mechanism to displace the light modulation element or photosensitive material. Consequently, an adverse effect, such as vibration, to the light modulation element can be prevented in a reliable manner, while the pixel displacement can be readily effected not only with a sheet paper, but also a roll of paper.

Also, the photograph printing device of the present invention may be a photograph printing device including a light modulation element, provided with a plurality of pixels and controlling supply of light to a photosensitive material through each pixel in accordance with image data, and, by irradiating light from a light source to the photosensitive material through the light modulation element, printing out an image corresponding to the image data onto the photosensitive material, which is arranged to include light irradiation control means for sequentially generating more than one beam of light, each having a different optic axis, from incident light through a particular pixel in the light modulation element, and irradiating each of generated beams of light to the photosensitive material at different timing.

According to the above arrangement, the light emitted from the light source through the particular pixel in the light modulation element is irradiated to the photosensitive material through the light irradiation control means. Because the light irradiation control means sequentially generates more than one beam of light, each having a different optic axis, from the incident light, and irradiates each to the photosensitive material at different timing, the number of pixels on the photosensitive material corresponding to the particular pixel in the light modulation element increases with the number of irradiated beams of light without displacing the light modulation element or photosensitive material relatively with respect to the other. Consequently, attained resolution is nearly as high as the one obtained by displacing the light modulation element or photosensitive material relatively with respect to the other.

Thus, according to the above arrangement, the pixel displacement can be effected to improve resolution of a printed out image while the light modulation element and photosensitive material are fixed to their original positions, thereby making it possible to omit a driving device or mechanism to displace the light modulation element or photosensitive material. Consequently, an adverse effect, such as vibration, to the light modulation element can be prevented in a reliable manner, while the pixel displacement can be readily effected not only with a sheet paper, but also a roll of paper.

The photograph printing device of the present embodiment may be arranged in such a manner that the image data which corresponds to light irradiated to the photosensitive material through a same particular pixel in the light modulation element is updated for each beam of light to be irradiated.

According to the above arrangement, each of the pixels corresponding to the particular pixel in the light modulation element can be printed out onto the photosensitive material in accordance the image data of a different kind. Consequently, in comparison with a case where the particular pixel in the light modulation element is driven repetitively by the same image data, a high-definition image can be printed out.

Also, the photograph printing device of the present invention may be arranged in such a manner that the light irradiation control means includes a refracting member for refracting incident light, which is allowed to rotate so as to irradiate the refracted light to the photosensitive material at different irradiation positions.

According to the above arrangement, of all the beams of light incident through the particular pixel in the light modulation element, only the light refracted by the refracting member is irradiated to the photosensitive material at different irradiation positions by means of rotation of the refracting member. Consequently, the number of pixels on the photosensitive material corresponding to the particular pixel in the light modulation element can be increased in a reliable manner, thereby ensuring improvement in overall resolution of an image printed out onto the photosensitive material.

Also, the photograph printing device of the present invention may be arranged in such a manner that the double refracting means includes a splitting element for splitting incident light from the light modulation element into an ordinary ray and an extraordinary ray, and a polarizing element for transmitting only the extraordinary ray among all of the rays exiting from the splitting element, wherein the splitting element and polarizing element are formed to be allowed to rotate together as one unit, so that the extraordinary ray is irradiated to the photosensitive material at different irradiation positions.

According to the above arrangement, incident light through the particular pixel in the light modulation element is split into the ordinary ray and extraordinary ray by the splitting element, and only the extraordinary ray is irradiated to the photosensitive material at different irradiation positions by means of rotation of the splinting element and polarizing element as one unit. Consequently, the number of pixels on the photosensitive material corresponding to the particular pixel in the light modulation element can be increased in a reliable manner, thereby ensuring improvement in overall resolution of an image printed out onto the photosensitive material.

Also, the photograph printing device of the present invention may be arranged in such a manner that the double refracting means further includes a converting element for converting incident light to circularly polarized light to be supplied to the splitting element.

In order to obtained at least the extraordinary ray from the splitting element, incident light has to be the light having the same oscillating direction as that of the extraordinary ray or light having a component in the same direction as the oscillating direction of the extraordinary ray.

In case that the incident light on the splitting element is linearly polarized light which does not satisfy the foregoing conditions, no extraordinary ray is obtained by the splitting element. Thus, in case that such light exits from the light modulation element, the pixel displacement using the extraordinary ray can not be effected.

On the other hand, in case that the incident light on the splitting element is circularly polarized light, the extraordinary ray can be generated by the splitting element in a reliable manner, because such incident light includes at least a component in the same direction as the oscillating direction of the extraordinary ray.

Thus, by providing the converting element which can supply circularly polarized light to the splitting element in the above manner, the pixel displacement using the extraordinary ray can be effected in a stable manner.

Also, the photograph printing device of the present invention may be arranged in such a manner that the light irradiation control means includes a splitting element for splitting incident light into more than one beams of light each having a different optic axis, first limiting means for limiting incident light on the splitting element, and second limiting means for limiting exit light from the splitting element, and that each of the first and second limiting means is a polarizing element which transmits only light having a specific polarizing direction, and the polarizing direction of each polarizing plate is adjusted separately so that only a single beam of light having the specific polarizing direction is taken out from the splitting element and selectively supplied to the photosensitive material.

According to the above arrangement, the incident light on the light irradiation control means is split into more than one beam of light each having a different optic axis by the splitting element, and only one beam of light having the specific polarizing direction is taken out from the splitting element and selectively supplied to the photosensitive material by adjusting the polarizing direction of each polarizing element (first and second limiting means). Consequently, the number of pixels on the photosensitive material corresponding to the particular pixel in the light modulation element can be increased in a reliable manner, thereby ensuring improvement in overall resolution of an image printed out onto the photosensitive material.

Also, the photograph printing device of the present invention may be arranged in such a manner that the light irradiation control means includes a splitting element for splitting incident light into more than one beam of light each having a different optic axis, first limiting means for limiting incident light on the separating element, and second limiting means for limiting exit light from the splinting element, and that the first limiting means is a modulation member for modulating incident light to reach the separating element, and the second limiting means is a polarizing element for transmitting only light having a specific polarizing direction, and that the incident light on the splitting element is modulated by the modulation member while the polarizing direction of the polarizing element is adjusted, so that only a single beam of light having the specific polarizing direction is taken out from the splitting element and selectively irradiated to the photosensitive material.

According to the above arrangement, the incident light on the light irradiation control means is split into more than one beam of light each having a different optic axis, and only one beam of light having the specific polarizing direction is taken out from the splitting element and selectively supplied to the photosensitive material by the function of the modulation member (first limiting means) and polarizing element (second limiting means). Consequently, the number of pixels on the photosensitive material corresponding to the particular pixel in the light modulation element can be increased in a reliable manner, thereby ensuring improvement in overall resolution of an image printed out onto the photosensitive material.

Also, if the above modulation member is used as the first limiting mean, unlike the case where the first limiting means is composed of the polarizing element and converting element, such as a ¼ wavelength plate, light having the same light quantity as that of the incident light can be supplied to the splitting element. Consequently, the utilization of light emitted from the light source can be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A photograph printing device comprising:
   a light modulation element, provided with a plurality of pixels, for controlling supply of light to a photosensitive material through each pixel in accordance with image data;
   a light source for irradiating light to said light modulation element; and
   light irradiation control means for generating more than one beam of light, each having a different optic axis, from incident light through a particular pixel in said light modulation element, and for irradiating each of generated beams of light to said photosensitive material;

wherein said light irradiation control means generates, from the incident light through said particular pixel in said light modulation element, a beam of light having an optic axis different from an optic axis of the incident light, and irradiates said generated beam of light to said photosensitive material at different irradiation positions; and wherein said light irradiation control means includes a refracting member that is rotateable about the optic axis of the incident light or an axis parallel to the optic axis for refracting light incident thereon; and said refracting member is allowed to rotate so as to irradiate refracted light to said photosensitive material at different irradiation positions.

2. The photograph printing device of claim 1, further comprising a glass plate fixed to said light irradiation control means at a light-exit side thereof.

3. The photograph printing device of claim 1, further comprising a box for housing said light modulation element.

4. The photograph printing device of claim 3, wherein said box includes:
ventilation means for letting air in said box out; and
dust-proof means for blocking dust.

5. The photograph printing device of claim 1, wherein said light modulation element drives said particular pixel in said light modulation element in accordance with different image data at least once each time said light irradiation control means shines the beams of light traveling via said particular pixel to said photosensitive material.

6. A photograph printing device comprising:
a light modulation element, provided with a plurality of pixels, for controlling supply of light to a photosensitive material through each pixel in accordance with image data;
a light source for irradiating light to said light modulation element; and
light irradiation control means for generating more than one beam of light, each having a different optic axis, from incident light through a particular pixel in said light modulation element, and for irradiating each of generated beams of light to said photosensitive material;
wherein said light irradiation control means generates, from the incident light through said particular pixel in said light modulation element, a beam of light having an optic axis different from an optic axis of the incident light, and irradiates said generated beam of light to said photosensitive material at different irradiation positions; wherein said light irradiation control means includes:
a refracting member that is rotateable about the optic axis of the incident light or an axis parallel to the optic axis for refracting light incident thereon; and
rotating means for rotating said refracting member, so that refracted light from said refracting member is irradiated to said photosensitive material at different irradiation positions.

7. The photograph printing device of claim 6, wherein a thickness of said refracting member is set in such a manner that irradiation areas of light irradiated to said photosensitive material through a same particular pixel in said light modulation element are formed adjacently to each other.

8. The photograph printing device of claim 6, wherein an optic axis linking said light modulation element and said photosensitive material is displaced with respect to an axis of rotation of said double refracting member.

9. The photograph printing device of claim 6, further comprising a glass plate fixed to said light irradiation control means at a light-exit side thereof.

10. The photograph printing device of claim 6, further comprising a box for housing said light modulation element.

11. The photograph printing device of claim 10, wherein said box includes:
ventilation means for letting air in said box out; and
dust-proof means for blocking dust.

12. The photograph printing device of claim 6, wherein said light modulation element drives said particular pixel in said light modulation element in accordance with different image data at least once each time said light irradiation control means shines the beams of light traveling via said particular pixel to said photosensitive material.

13. A photograph printing device comprising:
a light modulation element, provided with a plurality of pixels, for controlling supply of light to a photosensitive material through each pixel in accordance with image data;
a light source for irradiating light to said light modulation element; and
light irradiation control means for generating more than one beam of light, each having a different optic axis, from incident light through a particular pixel in said light modulation element, and for irradiating each of generated beams of light to said photosensitive material, wherein said light irradiation control means generates, from the incident light through said particular pixel in said light modulation element, a beam of light having an optic axis different from an optic axis of the incident light, and irradiates said generated beam of light to said photosensitive material at different irradiation positions, wherein said light irradiation control means includes:
a refracting member for refracting light incident thereon; and
rotating means for rotating said refracting member, so that refracted light from said refracting member is irradiated to said photosensitive material at different irradiation positions, wherein:
said light modulation element is a liquid crystal layer;
said light irradiation control means includes a polarizing plate which, of all beams of light exiting from said liquid crystal layer, transmits only light having a specific polarizing direction; and
said refracting member is provided to form one unit with said polarizing plate in such a manner that a refracting direction of light incident thereon becomes parallel to a polarizing direction of said polarizing plate.

14. The photograph printing device of claim 13, wherein said refracting member is a double refracting plate.

15. The photograph printing device of claim 13, further comprising:
a glass plate fixed to said light irradiation control means at a light-exit side thereof; and
a box for housing said light modulation element,
one of said double refracting member, polarizing plate, glass plate being provided to one face of said box.

16. A photograph printing device comprising:
a light modulation element, provided with a plurality of pixels, for controlling supply of light to a photosensitive material through each pixel in accordance with image data;
a light source for irradiating light to said light modulation element; and light irradiation control means for generating more than one beam of light, each having a different optic axis, from incident light through a particular pixel in said light modulation element, and for irradiating each of generated beams of light to said photosensitive material;

wherein said light irradiation control means splits the incident light through said particular pixel in said light modulation element into an ordinary ray which travels along a straight optic axis and an extraordinary ray which travels along an optic axis parallel to the straight optic axis, and irradiates only the extraordinary ray to said photosensitive material at different irradiation positions.

17. The photograph printing device of claim 16, further comprising a glass plate fixed to said light irradiation control means at a light-exit side thereof.

18. The photograph printing device of claim 16, further comprising a box for housing said light modulation element.

19. The photograph printing device of claim 18, wherein said box includes:

ventilation means for letting air in said box out; and dust-proof means for blocking dust.

20. The photograph printing device of claim 16, wherein said light modulation element drives said particular pixel in said light modulation element in accordance with different image data at least once each time said light irradiation control means shines the beams of light traveling via said particular pixel to said photosensitive material.

21. A photograph printing device comprising:

a light modulation element, provided with a plurality of pixels, for controlling supply of light to a photosensitive material through each pixel in accordance with image data;

a light source for irradiating light to said light modulation element; and light irradiation control means for generating more than one beam of light, each having a different optic axis, from incident light through a particular pixel in said light modulation element, and for irradiating each of generated beams of light to said photosensitive material, wherein said light irradiation control means splits the incident light through said particular pixel in said light modulation element into an ordinary ray which travels along a straight optic axis and an extraordinary ray which travels along a refracted optic axis, and irradiates only the extraordinary ray to said photosensitive material at different irradiation positions, and wherein said light irradiation control means includes:

a splitting element which splits the incident light through said light modulation element into the ordinary ray and the extraordinary ray; and a polarizing element for, of all beams of light exiting from said splitting element, transmitting only the extraordinary ray, said splitting element and said polarizing element being allowed to rotate together as one unit and irradiate the extraordinary ray to said photosensitive material at different irradiation positions.

22. The photograph printing device of claim 21, wherein said light irradiation control means further includes a converting element for converting the incident light from said light modulation element to circularly polarized light to be supplied to said splitting element.

23. A photograph printing device comprising:

a light modulation element, provided with a plurality of pixels, for controlling supply of light to a photosensitive material through each pixel in accordance with image data;

a light source for irradiating light to said light modulation element; and light irradiation control means for generating more than one beam of light, each having a different optic axis, from incident light through a particular pixel in said light modulation element, and for irradiating each of generated beams of light to said photosensitive material; wherein said light irradiation control means splits the incident light through said particular pixel in said light modulation element into an ordinary ray which travels along a straight optic axis and an extraordinary ray which travels along a refracted optic axis, and irradiates only the extraordinary ray to said photosensitive material at different irradiation positions; and wherein said light modulation element includes a liquid crystal layer, and a polarizing plate which allows only light having a specific polarizing direction to pass through said liquid crystal layer.

24. A photograph printing device comprising:

a light modulation element, provided with a plurality of pixels, for controlling supply of light to a photosensitive material through each pixel in accordance with image data;

a light source for irradiating light to said light modulation element; and light irradiation control means for generating more than one beam of light, each having a different optic axis, from incident light through a particular pixel in said light modulation element, and for irradiating each of generated beams of light to said photosensitive material;

wherein said light irradiation control means includes:

a splitting element for splitting light incident thereon to more than one beam of light each having a different optic axis;

first limiting means for limiting the light incident on said splitting element; and second limiting means for limiting exit light from said splitting element, said first and second limiting means being polarizing elements which transmit light having their respective polarizing directions, the polarizing directions of said polarizing elements being set separately, so that, of all beams of light from said splitting element, only light having a specific optic axis is selectively supplied to said photosensitive material.

25. The photograph printing device of claim 24, wherein said splitting element includes a plurality of double refracting members, each of which splitting light incident thereon into two beams of light each having a different optic axis.

26. The photograph printing device of claim 25, wherein:

said splitting element further includes a converting element which converts light incident thereon to circularly polarized light; and said converting element is provided between said plurality of double refracting members.

27. The photograph printing device of claim 25, wherein:

said light modulation element includes a liquid crystal layer, and polarizing plates provided respectively to a light-incident side and a light-exit side of said liquid crystal layer; and a polarizing direction of each of said polarizing plates is set in such a manner so as to differ from a splitting direction of one of said plurality of double refracting members, at which light having passed through said first limiting member reaches first.

28. The photograph printing device of claim 27, wherein the polarizing direction of each of said polarizing plates is set so as to be shifted by 45 degrees with respect to the splitting direction of said double refracting member, at which light having passed through said first limiting member reaches first.

29. The photograph printing device of claim 24, wherein said splitting element is a 4-point-splitting double refracting filter which splits incident light into four beams of light each having a different optic axis.

30. The photograph printing device of claim 24, wherein said light irradiation control means further includes a converting element for converting the incident light from said light modulation element to circularly polarized light to be supplied to said first limiting means.

31. The photograph printing device of claim 30, wherein said light modulation element includes a liquid crystal layer, and a polarizing plate which allows only light having a specific polarizing direction to pass through said liquid crystal layer.

32. The photograph printing device of claim 24, wherein:
said light modulation element is a liquid crystal layer; and
said first limiting means also serves as a polarizing plate which allows only light having a specific polarizing direction to pass through said liquid crystal layer.

33. The photograph printing device of claim 24, further comprising a glass plate fixed to said light irradiation control means at a light-exit side thereof.

34. The photograph printing device of claim 24, further comprising a box for housing said light modulation element.

35. The photograph printing device of claim 34, wherein said box includes:
ventilation means for letting air in said box out; and
dust-proof means for blocking dust.

36. The photograph printing device of claim 24, wherein said light modulation element drives said particular pixel in said light modulation element in accordance with different image data at least once each time said light irradiation control means shines the beams of light traveling via said particular pixel to said photosensitive material.

37. A photograph printing device comprising:
a light modulation element, provided with a plurality of pixels, for controlling supply of light to a photosensitive material through each pixel in accordance with image data;
a light source for irradiating light to said light modulation element; and
light irradiation control means for generating more than one beam of light, each having a different optic axis, from incident light through a particular pixel in said light modulation element, and for irradiating each of generated beams of light to said photosensitive material;
wherein said light irradiation control means includes:
a splitting element for splitting light incident thereon to more than one beam of light each having a different optic axis;
first limiting means for limiting the light incident on said splitting element; and
second limiting means for limiting exit light from said splitting element, said first limiting means being a modulation member for modulating light incident thereon to reach said splitting element,
said second limiting means being a polarizing element for transmitting only light having a specific polarizing direction,
the light incident on said splitting element being modulated by said modulation member and the polarizing direction of said polarizing element being adjusted in such a manner that only light having a specific optic axis is selectively irradiated to said photosensitive material from said splitting element.

38. The photograph printing device of claim 37, wherein said modulation member is a liquid crystal layer.

39. The photograph printing device of claim 37, further comprising a glass plate fixed to said light irradiation control means at a light-exit side thereof.

40. The photograph printing device of claim 37, further comprising a box for housing said light modulation element.

41. The photograph printing device of claim 40, wherein said box includes:
ventilation means for letting air in said box out; and
dust-proof means for blocking dust.

42. The photograph printing device of claim 37, wherein said light modulation element drives said particular pixel in said light modulation element in accordance with different image data at least once each time said light irradiation control means shines the beams of light traveling via said particular pixel to said photosensitive material.

43. A photograph printing device comprising:
a light modulation element, provided with a plurality of pixels, for controlling supply of light to a photosensitive material through each pixel in accordance with image data;
a light source for irradiating light to said light modulation element; and
light irradiation control means for generating more than one beam of light, each having a different optic axis, from incident light through a particular pixel in said light modulation element, and for irradiating each of generated beams of light to said photosensitive material;
wherein said light irradiation control means includes:
a splitting element for splitting light incident thereon into more than one beam of light each having a different optic axis; and
control means for limiting light incident on said splitting element;
and wherein said splitting element includes:
a plurality of double refracting members, each of which splitting the light incident thereon into two beams of light each having a different optic axis; and
a first modulation member, provided between said plurality of double refracting members, for modulating exit light from one of said plurality of double refracting members to reach another double refracting member,
said limiting means being a second modulation member for modulating light incident thereon to reach said splitting element,
the light incident on said splitting element being modulated by said second modulation member while light incident on said another double refracting member being modulated by said first modulation member in such a manner that only light having a specific optic axis is selectively irradiated to said photosensitive material from said splitting element.

44. The photograph printing device of claim 43, wherein each of said first modulation member and second modulation member is a liquid crystal layer.

45. The photograph printing device of claim 43, further comprising a glass plate fixed to said light irradiation control means at a light-exit side thereof.

46. The photograph printing device of claim 43, further comprising a box for housing said light modulation element.

47. The photograph printing device of claim 43, wherein said box includes:

ventilation means for letting air in said box out; and dust-proof means for blocking dust.

48. The photograph printing device of claim 43, wherein said light modulation element drives said particular pixel in said light modulation element in accordance with different image data at least once each time said light irradiation control means shines the beams of light traveling via said particular pixel to said photosensitive material.

* * * * *